US012339601B2

(12) United States Patent
Seki

(10) Patent No.: US 12,339,601 B2
(45) Date of Patent: Jun. 24, 2025

(54) DEVELOPER SUPPLYING CONTAINER

(71) Applicant: CANON KABUSHIKI KAISHA, Tokyo (JP)

(72) Inventor: Ryoto Seki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/415,984

(22) Filed: Jan. 18, 2024

(65) Prior Publication Data

US 2024/0248422 A1 Jul. 25, 2024

(30) Foreign Application Priority Data

Jan. 23, 2023 (JP) ................................ 2023-008243

(51) Int. Cl.
*G03G 15/08* (2006.01)

(52) U.S. Cl.
CPC ....... *G03G 15/0877* (2013.01); *G03G 15/087* (2013.01); *G03G 15/0872* (2013.01); *G03G 15/0894* (2013.01)

(58) Field of Classification Search
CPC ............. G03G 15/0867; G03G 15/087; G03G 15/0872; G03G 15/0877; G03G 15/0894; G03G 2215/0668; G03G 2215/0678
See application file for complete search history.

(56) References Cited

U.S. PATENT DOCUMENTS

| | | | | |
|---|---|---|---|---|
| 8,929,780 | B2 | 1/2015 | Yamabe et al. | |
| 9,811,024 | B2 | 11/2017 | Yomoda et al. | |
| 10,222,722 | B2 | 3/2019 | Yukimoto et al. | |
| 11,487,221 | B2 * | 11/2022 | Okino | G03G 15/0877 |
| 2020/0073289 | A1 * | 3/2020 | Fumoto | G03G 15/0872 |
| 2024/0411242 | A1 * | 12/2024 | Murakami | G03G 15/0872 |

FOREIGN PATENT DOCUMENTS

| | | | |
|---|---|---|---|
| JP | 2004271995 | A | 9/2004 |
| JP | 5582385 | B2 | 9/2014 |
| JP | 6025631 | B2 | 11/2016 |
| JP | 2017068078 | A | 4/2017 |
| JP | 2018066949 | A | 4/2018 |

* cited by examiner

*Primary Examiner* — Sophia S Chen
(74) *Attorney, Agent, or Firm* — ROSSI, KIMMS & McDOWELL LLP

(57) ABSTRACT

A developer supplying container includes a rotary cylindrical accommodating portion including an opening portion formed at one end portion of the accommodating portion in a rotation-axis direction, and a developer discharging portion including a connection portion and a discharging outlet. The connection portion includes a first separation portion and a second separation portion separated from each other in a direction intersecting with the rotation-axis direction. The accommodating portion includes a first engaging portion formed in an outer circumferential surface of the one end portion covered by the connection portion. At least one of the first separation portion and the second separation portion includes a second engaging portion configured to engage with the first engaging portion when the one end portion of the accommodating portion is covered by the connection portion, and prevent the connection portion from being disconnected from the accommodating portion in the rotation-axis direction.

7 Claims, 11 Drawing Sheets

DEVELOPER SUPPLYING CONTAINER

BACKGROUND OF THE INVENTION

Field of the Invention

The present invention relates to a developer supplying container suitably used for an image forming apparatus, such as a printer, a copying machine, a facsimile, or a multi-function printer, that uses the electrophotography.

Description of the Related Art

An electrophotographic image forming apparatus uses developer that is fine powder. For supplying the developer consumed for forming images on recording materials, a developer supplying container that stores the developer to be supplied is detachably attached to a developer supplying apparatus disposed in an image forming apparatus body. Japanese Patent No. 6025631 disclosures a developer supplying container that includes a developer discharging portion in which a discharging outlet is formed for discharging the developer, and a developer storage portion which stores the developer to be supplied. The developer supplying container is attached to the developer supplying apparatus such that the developer discharging portion does not rotate, and that the developer storage portion rotates with respect to the developer discharging portion. The developer to be supplied is conveyed to the discharging outlet by the rotation of the developer storage portion.

By the way, it has been desired recently that the used developer supplying container be reused. However, since the used developer supplying container may contain residual developer or may be dirt, it is necessary to disassemble and clean the developer supplying container for reusing the developer supplying container. For achieving this, Japanese Patent No. 5582385 discloses a configuration of the assembly of the developer supplying container. In this configuration, in a state where one end portion of the developer storage portion that is opened is inserted in the developer discharging portion, an engaging hook formed on the developer discharging portion catches an engaged portion, so that the developer storage portion is prevented from being disengaged from the developer discharging portion. If the engaged portion is released from the catch performed by the engaging hook, the developer supplying container can be separated into the developer storage portion and the developer discharging portion.

However, for releasing the engaged portion from the catch performed by the engaging hook when separating the developer storage portion and the developer discharging portion from each other, excessive force is easily applied to the developer storage portion and the developer discharging portion. In this case, the developer storage portion and the developer discharging portion may be damaged or deformed, and may become difficult to reuse.

The present invention has been made to solve the above-described problem, and aims to provide a developer supplying container in which the developer storage portion and the developer discharging portion can be separated from each other without being damaged and deformed in the developer supplying container in which the developer storage portion and the developer discharging portion can be separated from each other.

SUMMARY OF THE INVENTION

According to a first aspect of the present invention, a developer supplying container includes a rotary cylindrical accommodating portion including an opening portion formed at one end portion of the accommodating portion in a rotation-axis direction, the accommodating portion being configured to receive rotational driving force and rotate such that developer accommodated in the accommodating portion is conveyed toward the one end portion, and a developer discharging portion including a connection portion and a discharging outlet, the connection portion being a portion that is disposed to cover around the one end portion of the accommodating portion and to which the accommodating portion is connected relatively rotatably with respect to the developer discharging portion, the discharging outlet being configured to discharge developer supplied from the opening portion of the accommodating portion. The connection portion includes a first separation portion and a second separation portion configured to be separated from each other in a direction intersecting with the rotation-axis direction of the accommodating portion, and a connect engaging portion configured to detachably attach the second separation portion to the first separation portion. The accommodating portion includes a first engaging portion formed in an outer circumferential surface of the one end portion covered by the connection portion. At least one of the first separation portion and the second separation portion includes a second engaging portion configured to engage with the first engaging portion in a state where the one end portion of the accommodating portion is covered by the connection portion, and prevent the connection portion from being disconnected from the accommodating portion in the rotation-axis direction.

Further features of the present invention will become apparent from the following description of exemplary embodiments with reference to the attached drawings.

DESCRIPTION OF THE EMBODIMENTS

Image Forming Apparatus

Figure 1:
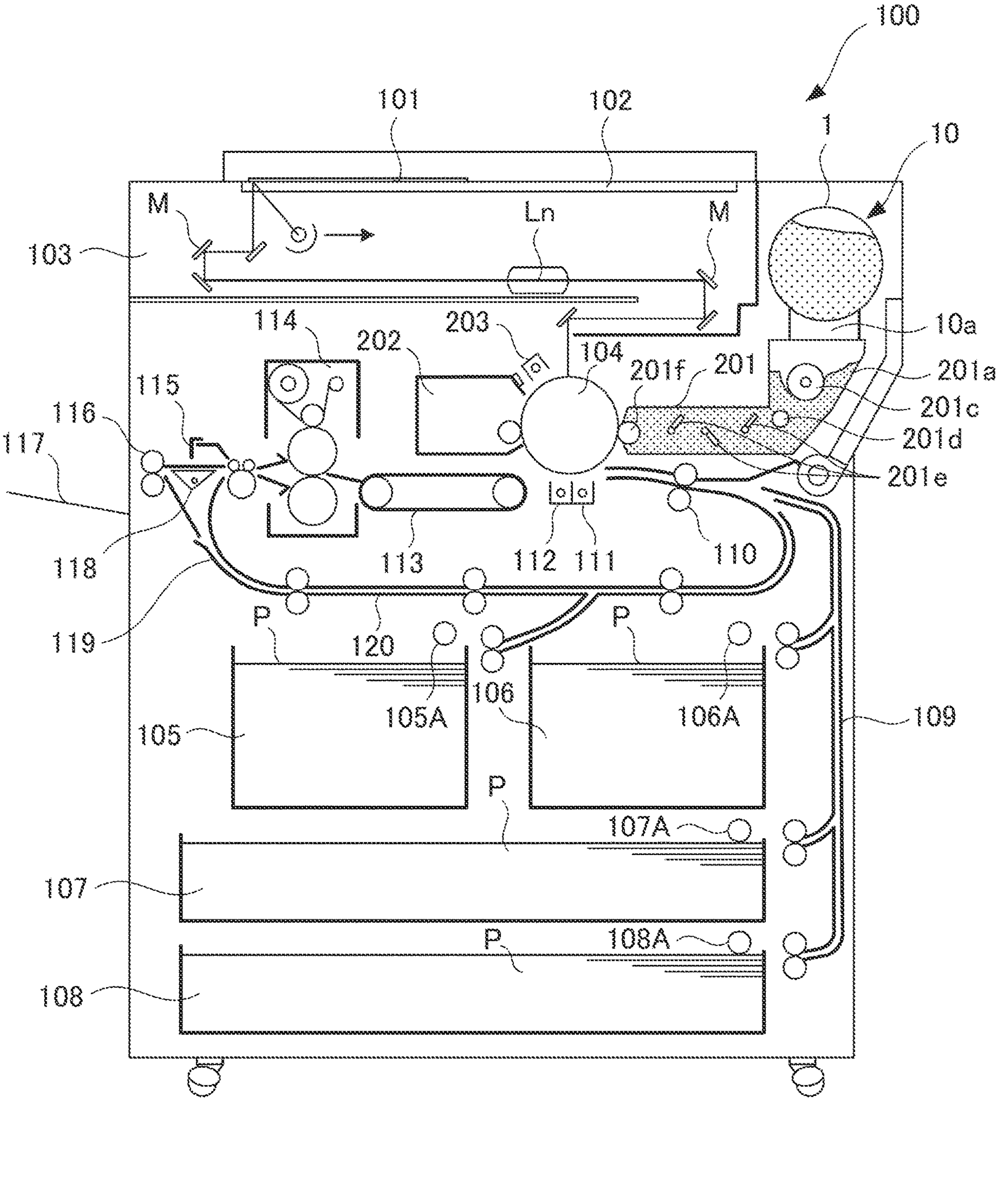
FIG. 1 is a schematic diagram illustrating an image forming apparatus to which a developer supplying container of the present embodiment can be applied.

Hereinafter, the present embodiment will be described. First, an image forming apparatus to which a developer supplying container of the present embodiment can be applied will be described with reference to FIG. 1. An image forming apparatus 100 illustrated in FIG. 1 obtains image information by reading a document 101 placed on a document platen glass 102, or by receiving the image information sent from an external apparatus (not illustrated), such as a personal computer, communicatively connected to the apparatus body of the image forming apparatus 100. Then, an optical image corresponding to the obtained image information is formed on an electrophotographic photoreceptor (hereinafter referred to as a photosensitive member 104) by a plurality of mirrors M and a lens Ln of an optical portion 103, so that an electrostatic latent image is formed on the photosensitive member 104. The electrostatic latent image is visualized by a dry development unit (i.e., a one-component development unit) 201*a* that uses toner (one-component magnetic toner) as the developer.

Note that although the description will be made, in the present embodiment, for an example in which the developer supplied from a developer supplying container 1 is the one-component magnetic toner, the present disclosure is not limited to this example. For example, a configuration as described below may be used.

Specifically, if a one-component development unit that performs the developing by using one-component nonmagnetic toner is used, the one-component nonmagnetic toner is used as the developer. In another case, a two-component development unit that performs the developing by using two-component developer may be used. The two-component developer is a developer in which the magnetic carrier and the nonmagnetic toner are mixed with each other. In this case, the nonmagnetic toner is supplied as the developer. Note that in this case, the magnetic carrier may be supplied as the developer, in addition to the nonmagnetic toner.

The recording material (hereinafter referred to as sheets) is stored in cassettes 105 to 108, in a state where the recording material is stacked on the cassettes 105 to 108. Among the cassettes 105 to 108, a cassette that stores a sheet P having an appropriate size is selected, based on the information inputted by a user operating an operation portion (not illustrated) disposed in the apparatus body, or on the sheet size of the document 101. Then, the sheet P is conveyed, one by one, from the selected one of the cassettes 105 to 108, by a corresponding one of feed-and-separation apparatuses 105A to 108A. Note that the sheet P may be a sheet material, such as a paper sheet, a plastic film, or a cloth sheet.

The single sheet P conveyed by one of the feed-and-separation apparatuses 105A to 108A is conveyed to a registration roller 110 through a conveyance portion 109. The registration roller 110 conveys the sheet P to a transfer charger 111 in synchronization with the timing of rotation of the photosensitive member 104 and the timing of scanning by the optical portion 103. The transfer charger 111 transfers a toner image formed on the photosensitive member 104 and made of the developer, to the sheet P. Then, a separation charger 112 separates the sheet P, to which the toner image has been transferred, from the photosensitive member 104. After that, the sheet P conveyed by a conveyance portion 113 is heated and pressed in a fixing portion 114. With this operation, the toner image on the sheet P is fixed to the sheet P.

In a case where the single-side printing in which an image is formed on only one side of the sheet P is performed, the sheet P to which the toner image has been fixed passes through a discharge-and-reverse portion 115, and is discharged to a discharging tray 117 by a discharging roller 116. On the other hand, in a case where the double-side printing in which images are formed on both sides of the sheet P is performed, the sheet P having a toner image formed on one side of the sheet P passes through the discharge-and-reverse portion 115, and one portion of the sheet P is temporarily discharged to the outside of the apparatus by the discharging roller 116. After that, when the trailing edge of the sheet P passes through a switching portion 118, the switching portion 118 is controlled, and the discharging roller 116 is rotated in a reverse direction at a timing at which the sheet P remains held by the discharging roller 116. With this operation, the sheet P is sent back into the apparatus body. The sheet P is conveyed to the registration roller 110 through refeeding-and-reconveying portions 119 and 120, then a toner image is fixed to the sheet P as in the single-side printing, and then the sheet P is discharged to the discharging tray 117.

In the image forming apparatus 100 configured as described above, image-forming-process apparatuses, such as the development unit 201*a*, a cleaner portion 202, and a primary charger 203, are disposed around the photosensitive member 104. Note that the development unit 201*a* develops an electrostatic latent image, formed on the photosensitive member 104 by the optical portion 103 in accordance with the image information of the document 101, by causing the developer to stick to the electrostatic latent image. In addition, the primary charger 203 uniformly charges the surface of the photosensitive member 104, for forming a desired electrostatic latent image on the photosensitive member 104. In addition, the cleaner portion 202 removes the developer left on the photosensitive member 104.

Developer Supplying Apparatus

Figure 2A:
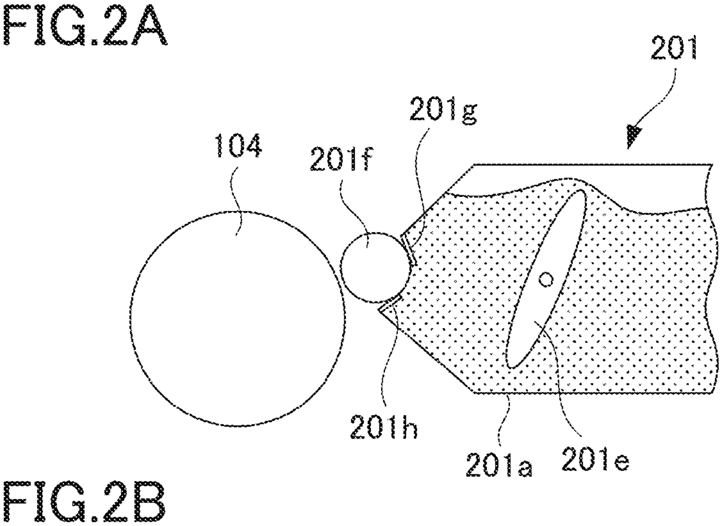
FIG. 2A is a partial cross-sectional view of a developer supplying apparatus.
Figure 2B:
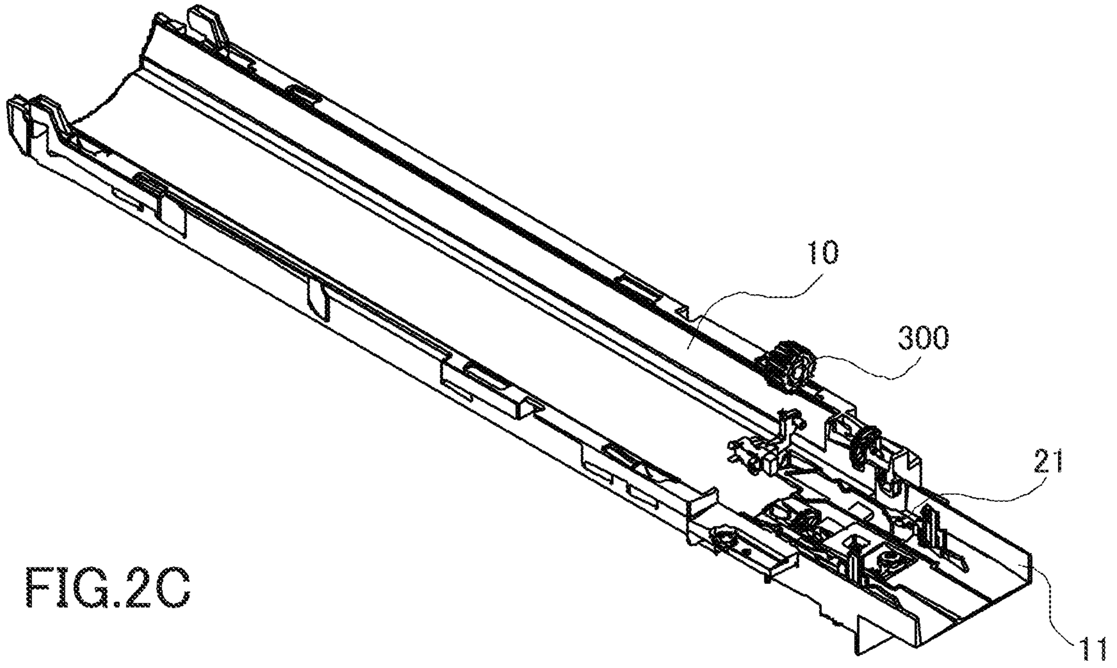
FIG. 2B is a perspective view of an attachment portion.
Figure 2C:
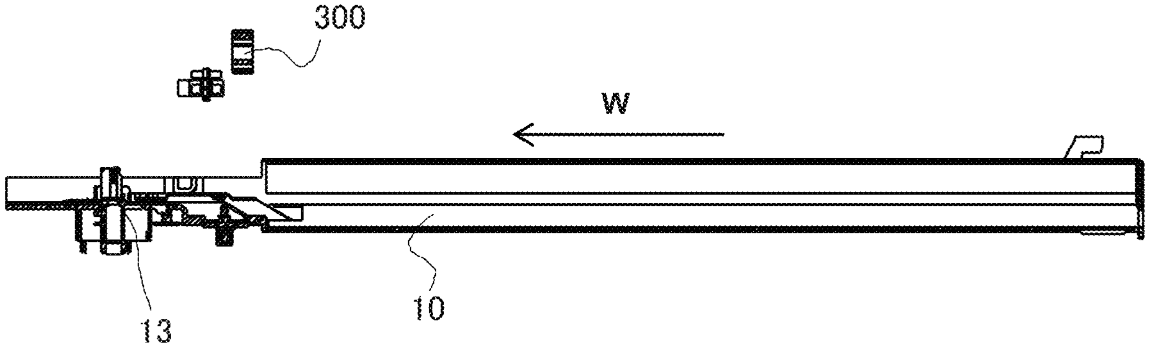
FIG. 2C is a cross-sectional view of the attachment portion.
Figure 3:
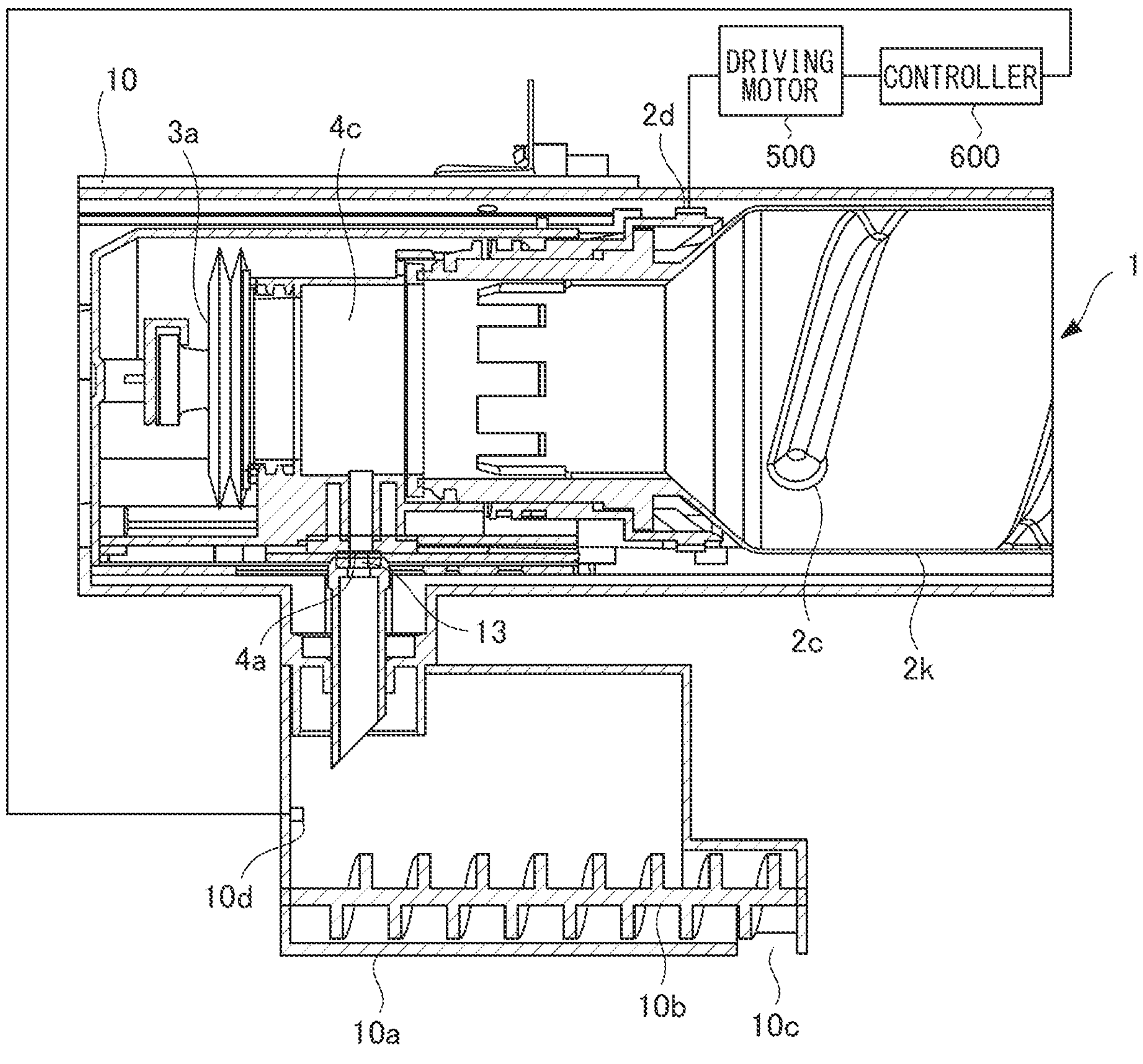
FIG. 3 is an enlarged cross-sectional view illustrating the developer supplying container and the developer supplying apparatus.
Figure 4:
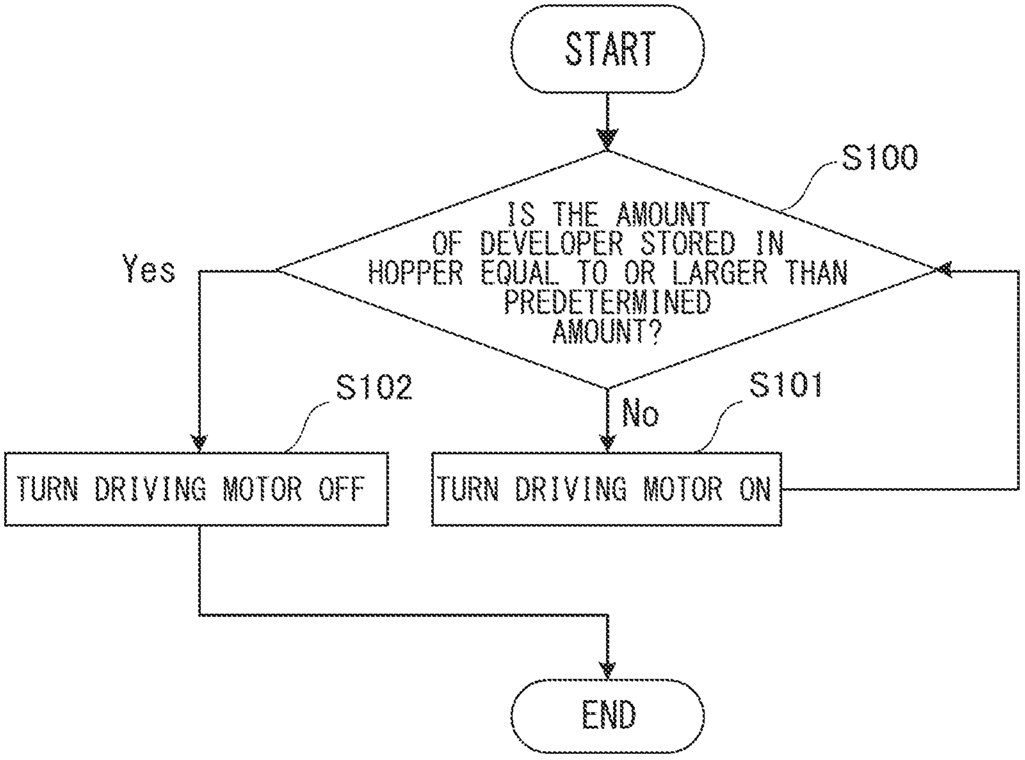
FIG. 4 is a flowchart illustrating a developer supplying process.

Next, a developer supplying apparatus 201 will be described with reference to FIGS. 1 to 3. The developer supplying apparatus 201 is disposed in the image forming apparatus 100, and the developer supplying container 1 is attached to and detached from the developer supplying apparatus 201. FIG. 2A is a partial cross-sectional view of the developer supplying apparatus 201. FIG. 2B is a perspective view of an external appearance of an attachment portion 10 into which the developer supplying container 1 can be inserted, and out of which the developer supplying container 1 can be drawn. FIG. 2C is a cross-sectional view of the attachment portion 10. FIG. 3 illustrates a control system and a partially enlarged cross section of the developer supplying container 1 and the developer supplying apparatus 201. FIG. 4 is a flowchart illustrating a flow of developer supplying processes performed by the control system.

As illustrated in FIG. 1, the developer supplying apparatus 201 includes the attachment portion 10, a hopper 10*a*, and the development unit 201*a*. The attachment portion 10 is a portion into which the developer supplying container 1 can be inserted, and out of which the developer supplying container 1 can be drawn. The hopper 10*a* temporarily stores the developer discharged from the developer supplying container 1. As illustrated in FIG. 20, the developer supplying container 1 is inserted into the attachment portion 10 in a direction indicated by an arrow W in FIG. 2C. The rotation-axis direction (i.e., the longitudinal direction) of the developer supplying container 1 is almost equal to the insertion direction. Note that the direction in which the developer supplying container 1 is separated from (or drawn out of) the attachment portion 10 is a direction opposite to the direction indicated by the arrow W in FIG. 2C.

As illustrated in FIGS. 1 and 2A, the development unit 201*a* includes a developing roller 201*f*, an agitating member 201*c*, and feeding members 201*d* and 201*e*. The developer supplied from the developer supplying container 1 is agitated by the agitating member 201*c*, fed to the developing roller 201*f* by the feeding members 201*d* and 201*e*, and supplied to the photosensitive member 104 by the developing roller 201*f*.

Note that the developing roller 201*f* includes a developing blade 201*g* and a leak prevention sheet 201*h*. The developing blade 201*g* regulates the amount of coating of the developer formed on the roller. The leak prevention sheet 201*h* is disposed in contact with the developing roller 201*f*, for preventing the developer from leaking from a space between the development unit 201*a* and the developing roller 201*f*.

As illustrated in FIG. 2B, the attachment portion 10 includes a rotational-direction regulation portion (i.e., a holding mechanism) 11. When the developer supplying container 1 is attached to the attachment portion 10, the rotational-direction regulation portion 11 abuts against a flange portion 4 (see FIG. 6A described below) of the developer supplying container 1, and thereby prevents the flange portion 4 from moving in the rotational direction.

The attachment portion 10 includes a developer receiving inlet 13. As illustrated in FIG. 3, when the developer supplying container 1 is attached to the attachment portion 10, the developer receiving inlet 13 communicates with a discharging outlet 4*a* of the developer supplying container 1, and receives the developer discharged from the developer supplying container 1. The developer discharged from the discharging outlet 4*a* of the developer supplying container 1 is supplied to the hopper 10*a* through the developer receiving inlet 13. The hopper 10*a* includes a conveyance screw 10*b*, an opening portion 10*c*, and a developer sensor 10*d*. The conveyance screw 10*b* conveys the developer to the development unit 201*a*. The opening portion 10*c* communicates with the development unit 201*a*. The developer sensor 10*d* detects the amount of developer stored in the hopper 10*a*. The developer discharged from the developer supplying container 1 is supplied to the development unit 201*a* by the hopper 10*a*.

Note that in the present embodiment, the diameter of the developer receiving inlet 13 is set, as a fine hole (i.e., a pinhole), at about 2.5 mm for preventing, as much as possible, the developer from making the interior of the attachment portion 10 dirty. Note that the diameter of the developer receiving inlet 13 may have any value as long as the developer can be discharged from the discharging outlet 4*a*.

In addition, as illustrated in FIGS. 2B and 2C, the attachment portion 10 includes a driving gear 300 that functions as a driving mechanism (i.e., a driving portion). The driving gear 300 receives the rotational driving force from a driving motor 500 (see FIG. 3) via a driving gear train, and applies the rotational driving force to the developer supplying container 1 that is set in the attachment portion 10.

As illustrated in FIG. 3, the operation of the driving motor 500 is controlled by a controller 600. The controller 600 controls the operation of the driving motor 500, depending on the information on the remaining amount of developer that is sent from the developer sensor 10*d*. The controller 600 controls not only the driving motor 500, but also the whole of the image forming apparatus 100. The controller 600 includes a central processing unit (CPU), a read only memory (ROM), and a random access memory (RAM). The CPU reads a program stored in the ROM and corresponding to a control procedure, and controls each component. The RAM stores work data and input data. The CPU refers to the data stored in the RAM, depending on the above-described program; and controls each component.

Note that in the present embodiment, the driving gear 300 is set so as to rotate in only one direction, for simplifying the control of the driving motor 500. That is, the controller 600 controls only ON (operation)/OFF (non-operation) of the driving motor 500. Thus, the driving mechanism of the developer supplying apparatus 201 can be simplified, compared with a configuration in which the reverse driving force, obtained by periodically switching the rotational direction of the driving motor 500 (or the driving gear 300) between a forward direction and a reverse direction, is applied to the developer supplying container 1.

Method of Attaching and Detaching Developer Supplying Container

Next, a method of attaching and detaching the developer supplying container 1 will be described. First, a user opens a replacement cover (not illustrated) disposed on the attachment portion 10, and inserts the developer supplying container 1 into the attachment portion 10. If the developer supplying container 1 is inserted into the attachment portion 10 by the user until the developer supplying container 1 reaches the back of the attachment portion 10, the attachment of the developer supplying container 1 to the developer supplying apparatus 201 is completed. After that, the user closes the replacement cover. Note that in a state where the developer supplying container 1 is attached to the attachment portion 10, the flange portion 4 of the developer supplying container 1 is held by and fixed to the attachment portion 10.

If the developer supplying container 1 contains almost no developer, a user opens the replacement cover and separates the developer supplying container 1 from the attachment portion 10 (that is, takes the developer supplying container 1 out of the attachment portion 10). Then, the user inserts another developer supplying container 1 filled with the developer, into the attachment portion 10 for attaching the developer supplying container 1 to the attachment portion 10, and closes the replacement cover. In this manner, a user can perform the replacement work of the developer supplying container 1.

Developer Supplying Control Performed by Developer Supplying Apparatus

Next, developer supplying control performed by the developer supplying apparatus 201 will be described with reference to a flowchart of FIG. 4. The developer supplying control is performed by the controller (CPU) 600 controlling each apparatus. In the present embodiment, the controller 600 controls the operation/non-operation of the driving motor 500, depending on an output signal from the developer sensor 10*d*, so that the hopper 10*a* stores less than a predetermined amount of developer.

Specifically, the developer sensor 10*d* checks the amount of storage of the developer stored in the hopper 10*a* (S100). If it is determined that the amount of storage of the developer detected by the developer sensor 10*d* is less than a predetermined amount (S100: No), that is, if the developer has not been detected by the developer sensor 10*d*, then the controller 600 drives the driving motor 500, and executes the developer supplying operation for a predetermined period of time (S101).

If it is determined as a result of the developer supplying operation that the amount of storage of the developer detected by the developer sensor 10*d* has reached the predetermined amount (S100: Yes), that is, if the developer has been detected the developer sensor 10*d*, then the controller 600 stops the driving of the driving motor 500, and stops the developer supplying operation (S102). With the stop of the developer supplying operation, a series of developer supplying processes is completed.

The developer supplying processes as described above are repeated if the developer is consumed in the image formation and the amount of storage of the developer stored in the hopper 10*a* becomes less than the predetermined amount.

Note that the developer supplying apparatus 201 may not have the above-described configuration in which the developer discharged from the developer supplying container 1 is temporarily stored in the hopper 10*a* and is then supplied to the development unit 201*a*. For example, a developer supplying apparatus as illustrated in FIG. 5 may be used.

Figure 5:
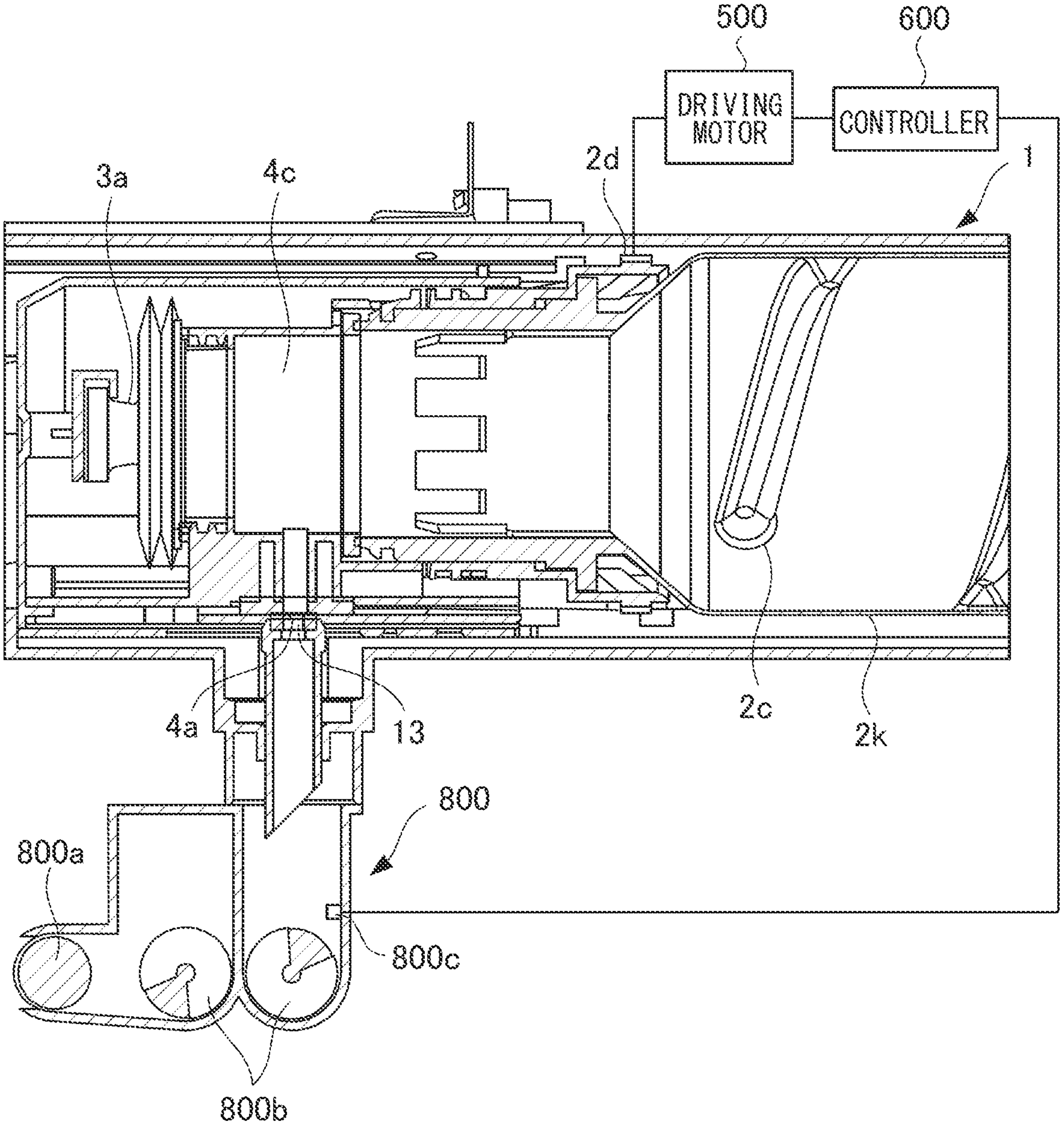
FIG. 5 is an enlarged cross-sectional view illustrating a modification of the developer supplying apparatus.

In the developer supplying apparatus illustrated in FIG. 5, the hopper 10*a* illustrated in FIG. 3 is not disposed, and the developer is directly supplied from the developer supplying container 1 to a development unit 800. The development unit 800 is a type of development units that performs the image formation by using the two-component developer that contains the nonmagnetic toner and the magnetic carrier. The development unit 800 includes an agitating chamber to which the developer is supplied, and a developing chamber which supplies the developer to a developing sleeve 800*a*. In addition, an agitating screw 800*b* is disposed in each of the agitating chamber and the developing chamber, and the direction in which the agitating screw 800*b* of the agitating chamber conveys the developer and the direction in which the agitating screw 800*b* of the developing chamber are opposite to each other. Since the agitating chamber and the developing chamber communicate with each other at both end portions of each of the agitating chamber and the developing chamber, the developer is conveyed and circulated in the two chambers. In the agitating chamber, a magnetic sensor 800*c* is disposed for detecting the toner density of the developer. Thus, the controller 600 controls the operation of the driving motor 500, depending on the detection result obtained by the magnetic sensor 800*c*. In this configuration, the developer supplied from the developer supplying container 1 is the nonmagnetic toner alone, or is the nonmagnetic toner and the magnetic carrier.

In the developer supplying apparatus illustrated in FIG. 5, the developer stored, or accommodated, in the developer supplying container 1 is hardly discharged from the discharging outlet 4*a* by the gravitational force. Instead, the developer is discharged from the discharging outlet 4*a* by the volume-variable operation performed by a pump portion 3*a*. As a result, the developer can be supplied stably while variations in the amount of discharge are suppressed.

Developer Supplying Container

Figure 6A:
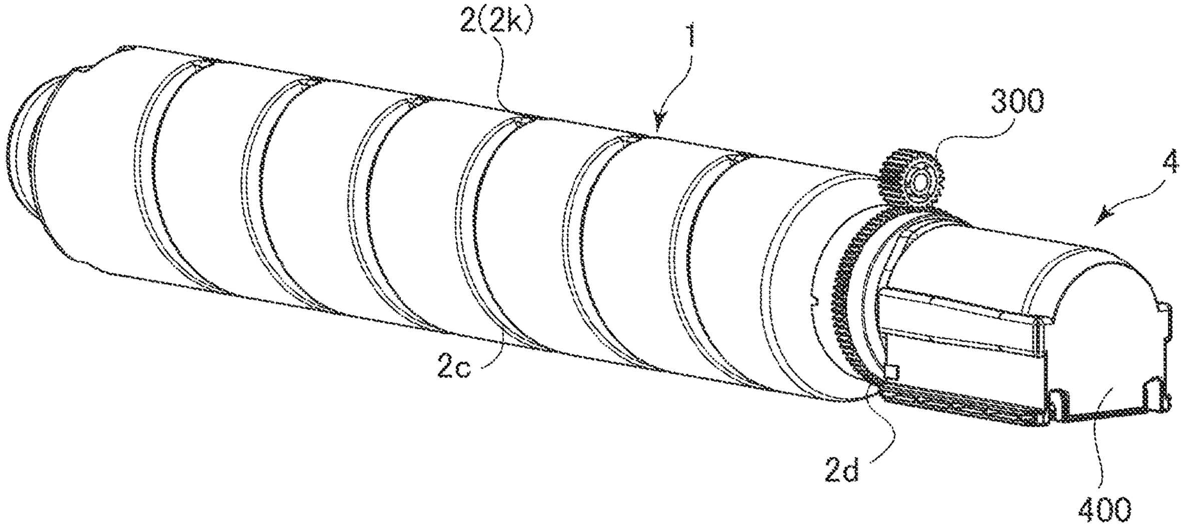
FIG. 6A is a perspective view illustrating the developer supplying container.
Figure 6B:
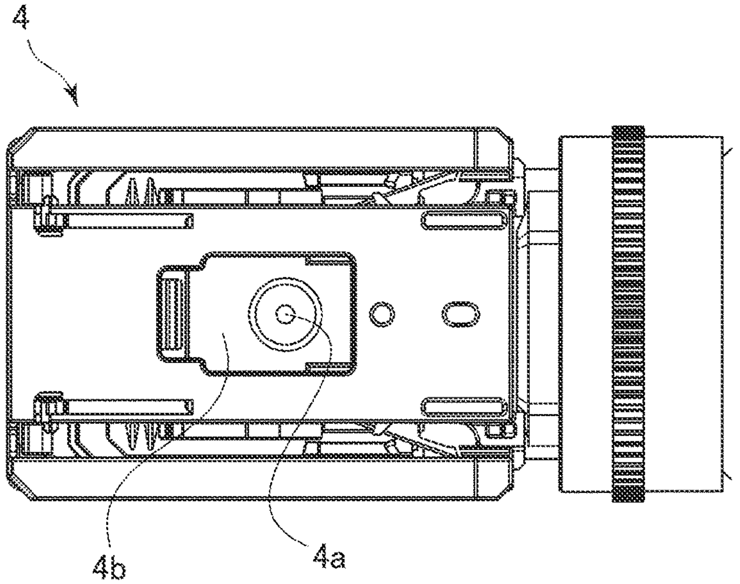
FIG. 6B is a partial enlarged view illustrating a discharging outlet and its surroundings.
Figure 7A:
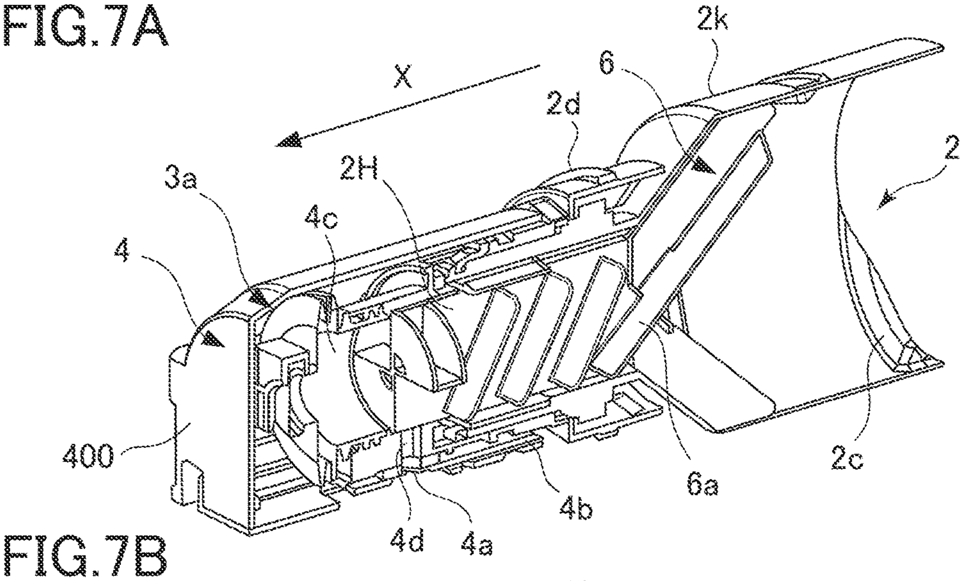
FIG. 7A is a perspective view illustrating a part of a cross section of the developer supplying container.
Figure 7B:
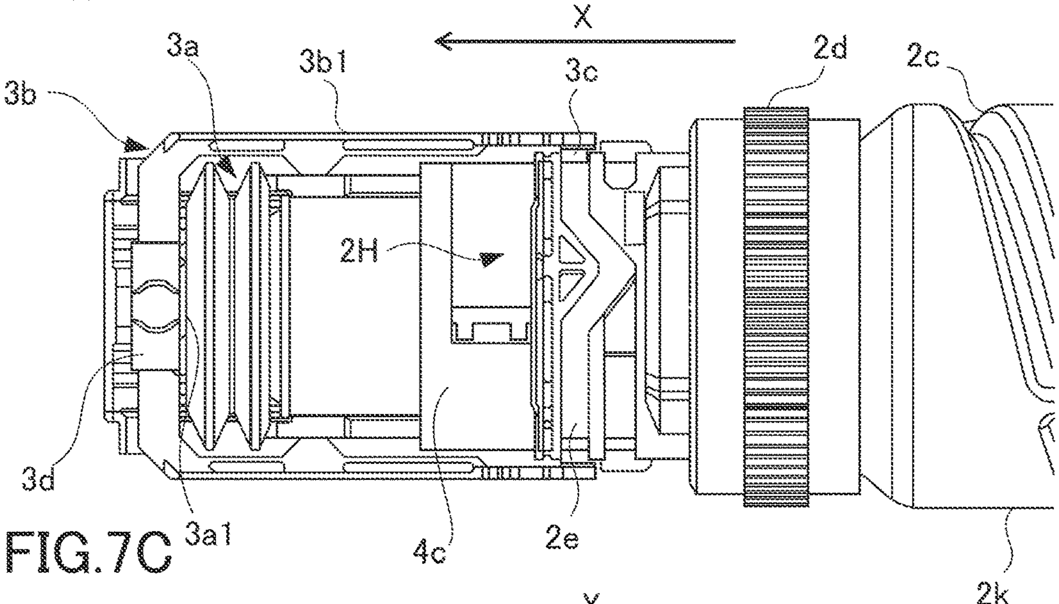
FIG. 7B is a top view illustrating a pump portion expanded to a maximum extent.
Figure 7C:
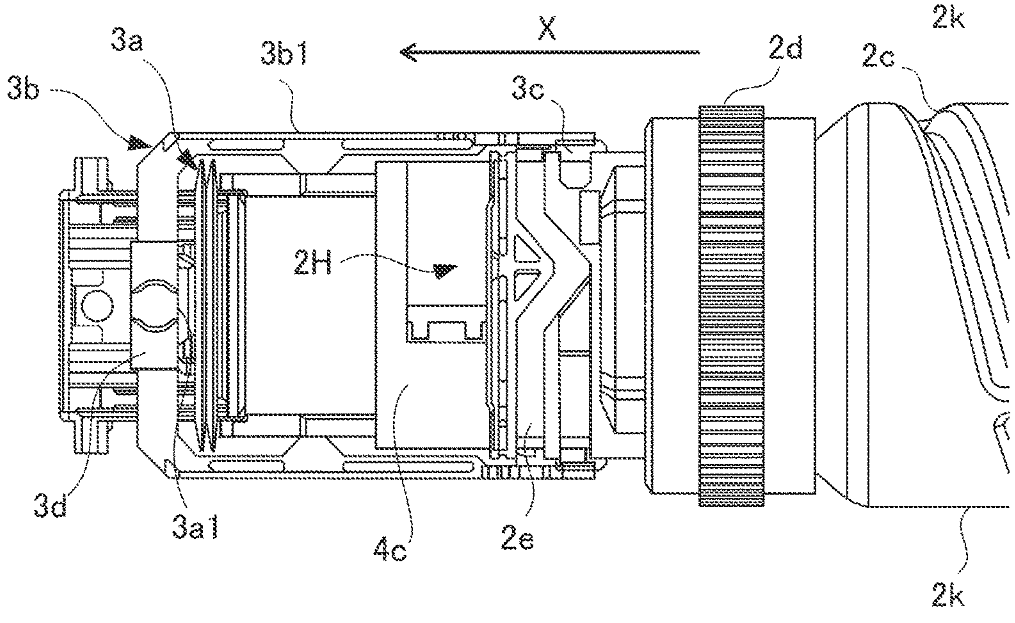
FIG. 7C is a top view illustrating the pump portion contracted to a maximum extent.

Next, the developer supplying container 1 of the present embodiment will be described with reference to FIGS. 2A to 2C, FIG. 3, and FIGS. 6A to 7C. First, an outline of the developer supplying container 1 of the present embodiment will be described. FIG. 6A is a perspective view illustrating the developer supplying container 1, and FIG. 6B is a partial enlarged view illustrating the discharging outlet 4*a* and its surroundings of the developer supplying container 1. FIG. 7A is a perspective view illustrating a partial cross-section of the developer supplying container 1. FIG. 7B is a top view illustrating the pump portion 3*a* expanded to a maximum extent. FIG. 7C is a top view illustrating the pump portion 3*a* contracted to a maximum extent.

As illustrated in FIGS. 6A and 7A, a cover 400 is attached to the developer supplying container 1. The cover 400 is attached to the developer supplying container 1 so as to cover the whole of the below-described flange portion 4, pump portion 3*a*, and reciprocating member 3*b*, for improving the external appearance of the developer supplying container 1 and for protecting the below-described pump portion 3*a* and reciprocating member 3*b*. The developer supplying container 1 includes a cylindrical developer storage portion 2 serving as an accommodating portion. The developer storage portion 2 has an internal space that is filled, in advance, with the developer to be supplied. An opening portion 2H is formed at one end portion of the developer storage portion 2 in the rotation-axis direction (i.e., the longitudinal direction), and the developer stored in the developer storage portion 2 is conveyed toward the one end portion having the opening portion 2H by the rotation of the developer storage portion 2. In addition, the developer supplying container 1 includes the flange portion 4 that serves as a developer discharging portion. The flange portion 4 is disposed at the one end portion of the developer storage portion 2, formed on the downstream side in the developer conveyance direction (i.e., a direction indicated by an arrow X). The developer storage portion 2 is relatively rotatable with respect to the flange portion 4. Note that the cross-sectional shape of the developer storage portion 2 may be a non-circular shape if the shape does not affect the rotation operation of the developer storage portion 2 in the developer supplying process. For example, the cross-sectional shape of the developer storage portion 2 may be an ellipse shape or a polygon shape.

Material of Developer Supplying Container

In the present embodiment, the developer is discharged from the discharging outlet 4*a* by the below-described pump portion 3*a* changing the volume of the developer supplying container 1. For this reason, it is preferable that the material of the developer supplying container 1 have rigidity that prevents the developer supplying container 1 from significantly shrinking and swelling when the volume of the developer supplying container 1 is changed.

In addition, the developer supplying container 1 of the present embodiment communicates with the outside of the developer supplying container 1 through the discharging outlet 4*a* alone. Thus, the developer supplying container 1 is hermetically sealed, except for the discharging outlet 4*a*. In this configuration, the developer is discharged from the discharging outlet 4*a* by the pump portion 3*a* decreasing and increasing the volume of the developer supplying container 1. For this reason, it is required to ensure the airtightness of the developer supplying container 1 that can keep the stable discharging performance.

In the present embodiment, the material of a cylindrical portion 2*k* of the developer storage portion 2 is a polyethylene terephthalate (PET) resin, the material of a below-described discharging portion 4*c* of the flange portion 4 is a polystyrene resin, and the material of the pump portion 3*a* is a polypropylene resin. Note that as to the material used, the material of the cylindrical portion 2*k* and the discharging portion 4*c* may be another resin, such as an acrylonitrile-butadiene-styrene copolymer (ABS) resin, a polyester resin, a polyethylene resin, or a polypropylene resin, if the material can withstand the change in volume of the developer supplying container 1.

Preferably, the material of the pump portion 3*a* allows the pump portion 3*a* to expand and contract, which can change the volume of the developer supplying container 1. For example, the pump portion 3*a* may be made of a thin material of ABS, polystyrene, polyester, or polyethylene. In another case, the pump portion 3*a* may be made of a material, such as rubber, that can expand and contract. Note that the pump portion 3*a*, the cylindrical portion 2*k*, and the discharging portion 4*c* may be made of the same material if the material allows each of the pump portion 3*a*, the cylindrical portion 2*k*, and the discharging portion 4*c* to function as described above (the material may allow each component to function as described above, with the thickness of the resin material of each component being adjusted, for example). In this case, the pump portion 3*a*, the cylindrical portion 2*k*, and the discharging portion 4*c* may be formed integrally with each other by using a method, such as an injection molding method or a blow molding method.

Hereinafter, the flange portion 4, the cylindrical portion 2*k*, and the pump portion 3*a* of the developer supplying container 1 will be described in this order.

Flange Portion

First, an outline of the flange portion 4 will be described. As illustrated in FIG. 7A, the flange portion 4 includes a hollow discharging portion 4*c* that temporarily stores the developer conveyed from the cylindrical portion 2*k*. One portion of the discharging portion 4*c* functions as a connection portion which is disposed so as to cover around the one end portion of the developer storage portion 2, and to which the developer storage portion 2 is connected relatively rotatably with respect to the flange portion 4. In the bottom portion of the discharging portion 4*c*, the discharging outlet 4*a* is formed for allowing the developer to be discharged from the discharging portion 4*c* to the outside of the developer supplying container 1. Above the discharging outlet 4*a*, a developer storing portion 4*d* is disposed. The developer storing portion 4*d* can store a predetermined amount of developer to be discharged.

The flange portion 4 also includes a shutter 4*b* that opens and closes the discharging outlet 4*a*. When the developer supplying container 1 is attached to the attachment portion 10, the shutter 4*b* abuts against an abutment portion 21 (see FIG. 2B) disposed in the attachment portion 10. If the shutter 4*b* abuts against the abutment portion 21, the shutter 4*b* slides with respect to the developer supplying container 1 along the rotation-axis direction of the cylindrical portion 2*k*, toward a direction opposite to the developer conveyance direction (i.e., the direction indicated by the arrow X); and thereby opens the discharging outlet 4*a*. As a result, the position of the discharging outlet 4*a* becomes equal to the position of the developer receiving inlet 13 (see FIG. 3), so that the discharging outlet 4*a* communicates with the developer receiving inlet 13 of the attachment portion 10. In this state, the developer can be supplied from the developer supplying container 1.

If the developer supplying container 1 is attached to the attachment portion 10, the flange portion 4 does not move substantially. Specifically, for preventing the flange portion 4 from rotating in the rotational direction of the cylindrical portion 2*k*, the developer supplying apparatus 201 includes a rotational-direction regulation portion 11 illustrated in FIG. 2B. Thus, in a state where the developer supplying container 1 is attached to the attachment portion 10, the discharging portion 4*c* formed in the flange portion 4 is also prevented substantially from moving in the rotational direction of the cylindrical portion 2*k* (although the slight movement, such as the movement caused by the play, is allowed). In contrast, the cylindrical portion 2*k* is not prevented, by the developer supplying apparatus 201, from rotating in the rotational direction; and rotates in the developer supplying process.

As illustrated in FIG. 7A, the developer storage portion 2 includes a conveyance member 6 that conveys the developer, conveyed from the cylindrical portion 2*k* to the conveyance member 6 by a helical projection portion (i.e., a conveyance projection) 2*c*, to the discharging portion 4*c*. The conveyance member 6 is disposed so as to divide one portion of the developer storage portion 2 into almost two portions, and rotates together with the cylindrical portion 2*k*. On both sides of the conveyance member 6, a plurality of sloped ribs 6*a* is disposed. The sloped ribs 6*a* are sloped toward the discharging portion 4*c*, with respect to the rotation-axis direction of the cylindrical portion 2*k*.

In the above-described configuration, the developer conveyed by the conveyance projection 2*c* is pushed up, in the vertical direction, by the plate-like conveyance member 6 in accordance with the rotation of the cylindrical portion 2*k*. After that, as the cylindrical portion 2*k* rotates, the developer slides down on the conveyance member 6 due to the gravitational force, and is delivered to the discharging portion 4*c* by the sloped ribs 6*a*. In this configuration, the sloped ribs 6*a* are disposed on both sides of the conveyance member 6 so that the developer is delivered to the discharging portion 4*c* every time the cylindrical portion 2*k* makes a half turn.

Cylindrical Portion

Next, the cylindrical portion 2*k* will be described. As illustrated in FIGS. 7A to 7C, the conveyance projection 2*c* is formed on the inner surface of the cylindrical portion 2*k*. The conveyance projection 2*c* is a projection formed helically, and functions as a portion that conveys the developer stored in the developer storage portion 2, toward the discharging portion 4*c* by the rotation of the conveyance projection 2*c* itself. The cylindrical portion 2*k* is formed by using the above-described resin material and a blow molding method or the like.

If the volume of the developer supplying container 1 is required to be increased for increasing the volume of developer that fills the developer supplying container 1, the volume of the discharging portion 4*c*, which serves as a developer storage space, might be increased in a height direction. In such a configuration, however, the gravitational force applied to the developer located in the vicinity of the discharging outlet 4*a* is increased due to the self weight of the developer. As a result, the developer in the vicinity of the discharging outlet 4*a* is compressed and made dense, and hinders the pump portion 3*a* from taking in or discharging air through the discharging outlet 4*a* (the intake operation and the discharge operation will be described below). In this case, the amount of change of volume of the pump portion 3*a* has to be further increased for making the developer, compressed and made dense, less dense by using the air taken in through the discharging outlet 4*a*, or for discharging the developer by using the air to be discharged through the discharging outlet 4*a*. In this case, however, since the driving force for driving the pump portion 3*a* is increased, the excessive load may be applied to the apparatus body of the image forming apparatus 100.

For this reason, in the present embodiment, the cylindrical portion 2*k* is disposed adjacent to the flange portion 4 in the horizontal direction, and the amount of developer that fills the developer supplying container 1 is increased by increasing the volume of the cylindrical portion 2*k*. In this configuration, the thickness of the developer layer formed on the discharging outlet 4*a* of the developer supplying container 1 can be made smaller than that in a developer supplying container in which the volume of the discharging portion 4*c* is increased in a height direction. In addition, since the developer of the developer layer formed by the gravitational force is made less dense, it is not necessary to increase the amount of change of volume of the pump portion 3*a*. Thus, the driving force for driving the pump portion 3*a* can be made smaller, and the developer can be discharged stably without applying the excessive load to the apparatus body of the image forming apparatus 100.

Pump Portion

Next, the pump portion 3*a* that can change its volume in accordance with the reciprocating motion of the pump portion 3*a* will be described. The pump portion 3*a* functions as an intake-and-discharge mechanism that alternately performs the intake operation and the discharge operation via the discharging outlet 4*a*. In other words, the pump portion 3*a* functions as an airflow generation mechanism that alternately generates the airflow that flows toward the interior of the developer supplying container 1 through the discharging outlet 4*a*, and the airflow that flows from the developer supplying container 1 toward the outside of the developer supplying container 1.

As illustrated in FIG. 7A, the pump portion 3*a* is disposed downstream of the discharging portion 4*c* in the developer conveyance direction (i.e., the direction indicated by the arrow X). The pump portion 3*a* does not rotate because the pump portion 3*a* is fixed to the discharging portion 4*c* of the flange portion 4. In addition, the pump portion 3*a* has a developer storage space formed in the pump portion 3*a* and capable of storing the developer. The developer storage space formed in the pump portion 3*a* plays an important role for fluidizing the developer in the below-described intake operation.

In the present embodiment, a volume-variable pump is used as the pump portion 3*a*. The volume-variable pump is made of resin, and the volume of the pump portion 3*a* can be varied in accordance with the reciprocating motion of the pump portion 3*a*. Specifically, as illustrated in FIGS. 7B and 7C, a bellows pump is used as the pump portion 3*a*, and in the bellows pump, a plurality of peak portions and valley portions are formed alternately with each other, at regular intervals. The pump portion 3*a* is alternately contracted and expanded in a repeated manner by the driving force from the developer supplying apparatus 201. If the pump portion 3*a* is used, the volume of the developer supplying container 1 can be varied, and can be changed alternately at predetermined intervals. As a result, the developer stored in the discharging portion 4*c* can be efficiently discharged from the discharging outlet 4*a* that has a small diameter (e.g., about 2.5 mm).

Driving-Force Receiving Portion

Next, a driving-force receiving portion of the developer supplying container 1 will be described. The driving-force receiving portion receives the rotational driving force, used for rotating the cylindrical portion 2*k* that includes the conveyance projection 2*c*, from the developer supplying apparatus 201.

As illustrated in FIG. 6A, the developer supplying container 1 includes a gear portion 2*d* that engages with, linked with, and driven by the driving gear 300 (that functions as a driving mechanism) of the developer supplying apparatus 201, and that functions as the driving-force receiving portion. The gear portion 2*d* rotates together with the cylindrical portion 2*k*. Thus, the cylindrical portion 2*k* is rotated together with the gear portion 2*d* by the rotational driving force applied from the driving gear 300 to the gear portion 2*d*, so that the developer stored in the cylindrical portion 2*k* can be conveyed to the discharging portion 4*c*.

Note that the gear portion 2*d* is disposed downstream of an almost central portion of the developer storage portion 2 in the developer conveyance direction. However, the present disclosure is not limited to this. For example, the gear portion 2*d* may be disposed upstream of an almost central portion of the developer storage portion 2 in the X direction. In this case, the driving gear 300 is disposed at a position that corresponds to the position of the gear portion 2*d*. In the present embodiment, the gear mechanism is used as the driving-and-linking mechanism between the developer supplying container 1 and the developer supplying apparatus 201. However, the present disclosure is not limited to this example. For example, a known coupling mechanism may be used as the driving-and-linking mechanism. Specifically, a non-circular recess portion may be formed in the developer supplying container 1, as the driving-force receiving portion; and a projection portion whose shape corresponds to the shape of the above-described recess portion may be formed as the driving portion of the developer supplying apparatus 201. In this case, the recess portion and the projection portion are linked with and driven by each other.

Driving-Force Conversion Mechanism

Next, a driving-force conversion mechanism of the developer supplying container 1 will be described. Note that the following description will be made, in the present embodiment, for a case where a cam mechanism is used as an example of the driving-force conversion mechanism. As illustrated in FIGS. 7B and 7C, the developer supplying container 1 includes a cam mechanism that functions as the driving-force conversion mechanism. The cam mechanism converts the rotational driving force, received by the gear portion 2*d* and used for rotating the cylindrical portion 2*k*, to the force applied in the direction in which the pump portion 3*a* is reciprocated. That is, in the present embodiment, the rotational driving force received by the gear portion 2*d* is converted to the power for reciprocating the pump portion 3*a*, in the developer supplying container 1. In this configuration, the driving force for rotating the cylindrical portion 2*k* and the driving force for reciprocating the pump portion 3*a* are received by the single driving-force receiving portion (i.e., the gear portion 2*d*). Thus, the configuration of the driving-force receiving portion of the developer supplying container 1 can be simplified, compared with the configuration in which two driving-force receiving portions are separately disposed in the developer supplying container 1. In addition, since the gear portion 2*d* receives the driving force from the single driving gear of the developer supplying apparatus 201, the driving-force output mechanism of the developer supplying apparatus 201 can also be simplified.

In the present embodiment, a reciprocating member 3*b* is used as a conversion member, via which the rotational driving force is converted to the power for reciprocating the pump portion 3*a*. Specifically, a cam groove 2*e* is formed in the outer circumferential surface of the cylindrical portion 2*k* that rotates via the driving-force receiving portion (i.e., the gear portion 2*d*) that receives the rotational driving force from the driving gear 300, and the cam groove 2*e* is engaged with a reciprocating-member projection 3*c* that projects from an arm portion 3*b*1 of the reciprocating member 3*b*. In this configuration, the reciprocating member 3*b* reciprocates along the groove of the cam groove 2*e*, in the developer conveyance direction (i.e., the direction indicated by the arrow X) and the direction opposite to the developer conveyance direction. In addition, since an engaging portion 3*a*1 of the pump portion 3*a* and a projection portion 3*d* formed on the reciprocating member 3*b* are engaged with each other, the reciprocating motion of the reciprocating member 3*b* becomes the power for reciprocating the pump portion 3*a*. Note that the reciprocating member 3*b* itself is prevented from rotating in the rotational direction of the cylindrical portion 2*k* (although the slight movement, such as the movement caused by the play, is allowed). In this manner, the cylindrical portion 2*k* is rotated by the rotational driving force applied from the driving gear 300, so that the reciprocating member 3*b* reciprocates along the cam groove 2*e*. Thus, the pump portion 3*a* alternately expands (FIG. 7B) and contracts (FIG. 7C) repeatedly, so that the volume of the developer supplying container 1 can be varied.

Note that as to the arrangement and number of the reciprocating-member projections 3*c*, at least one reciprocating-member projection 3*c* has only to be disposed. However, the moment may be produced, for example, in the driving-force conversion mechanism due to the reaction force produced when the pump portion 3*a* expands and contracts, so that the reciprocating motion may not be performed smoothly. For this reason, it is preferable that a plurality of reciprocating-member projections 3*c* be disposed for keeping the relationship between the reciprocating-member projections 3*c* and the shape of the below-described cam groove 2*e*. In the present embodiment, two reciprocating-member projections 3*c* are disposed, shifted in phase from each other by about 180°, so as to face each other; and are engaged with the cam groove 2*e*.

Arrangement and Position of Driving-Force Conversion Mechanism

As illustrated in FIGS. 7B and 7C, in the present embodiment, the driving-force conversion mechanism (i.e., the cam mechanism constituted by the reciprocating-member projection 3*c* and the cam groove 2*e*) is disposed outside the developer storage portion 2. That is, the driving-force conversion mechanism is disposed at a position separated from the internal space of the cylindrical portion 2*k* and the discharging portion 4*c* so that the driving-force conversion mechanism does not contact the developer stored in the internal space of the cylindrical portion 2*k* and the discharging portion 4*c*. With this arrangement, problems that could happen in a case where the driving-force conversion mechanism is disposed in the internal space of the developer storage portion 2 can be prevented. In the problems, if the developer enters a slide portion of the driving-force conversion mechanism, particles of the developer are heated and pressed, so that the particles are softened, and some particles stick to each other into a large lump (i.e., a coarse particle). In addition, if the developer bites the driving-force conversion mechanism, the torque may be increased. Such problems can be prevented by the above-described arrangement.

Cam Groove

Figure 8:
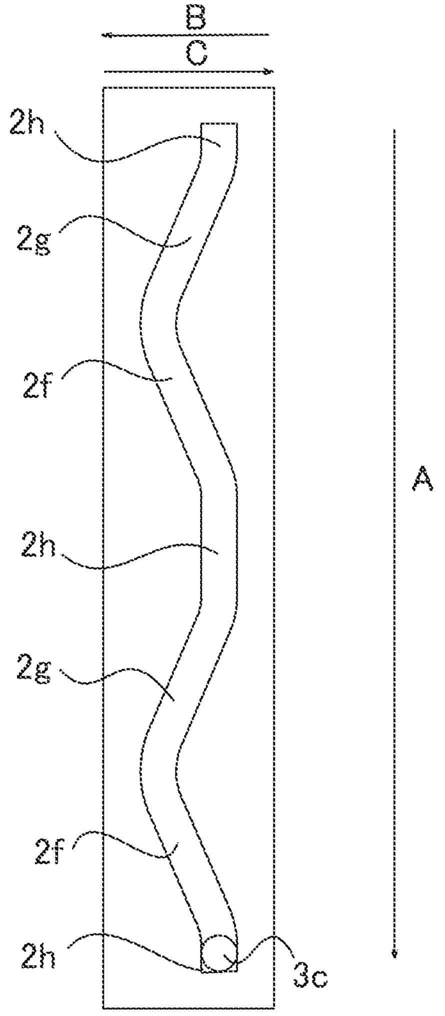
FIG. 8 is a developed view illustrating a cam-groove shape of the developer supplying container.

FIG. 8 illustrates one example of the shape of the above-described cam groove 2*e*. In FIG. 8, an arrow A indicates the rotational direction of the developer storage portion 2 (i.e., the direction in which the cam groove 2*e* moves), an arrow B indicates a direction in which the pump portion 3*a* expands, and an arrow C indicates a direction in which the pump portion 3*a* contracts. The cam groove 2*e* includes a cam groove 2*f*, a cam groove 2*g*, and a cam groove 2*h*. The cam groove 2*f* is an area used when the pump portion 3*a* is expanded, the cam groove 2*g* is an area used when the pump portion 3*a* is contracted, and the cam groove 2*h* is an area used when the pump portion 3*a* is not reciprocated. In the present embodiment, in a state where the reciprocating-member projection 3*c* of the reciprocating member 3*b* is moving in the cam groove 2*f*, the intake operation is performed via the discharging outlet 4*a* in accordance with the movement of the pump portion 3*a* (intake process). In addition, in a state where the reciprocating-member projection 3*c* is moving in the cam groove 2*g*, the discharge operation is performed via the discharging outlet 4*a* in accordance with the movement of the pump portion 3*a* (discharge process). In addition, in a state where the reciprocating-member projection 3*c* is moving in the cam groove 2*h*, the pump portion 3*a* is not moved, and the intake operation and the discharge operation via the discharging outlet 4*a* are not performed (operation stop process). Hereinafter, the intake process, the discharge process, and the operation stop process will be described in detail.

Intake Process

First, the intake process will be described. If the state of the pump portion 3*a* is changed by the above-described driving-force conversion mechanism (i.e., the cam mechanism) from a state in which the pump portion 3*a* is contracted to a maximum extent (FIG. 7C), to a state in which the pump portion 3*a* is expanded to a maximum extent (FIG. 7B), the intake operation is performed via the discharging outlet 4*a*. In the intake operation, the volume of the interior (i.e., the cylindrical portion 2*k*, the discharging portion 4*c*, and the pump portion 3*a*) of the developer supplying container 1 is increased. In this operation, the interior of the developer supplying container 1 is hermetically sealed substantially, except for the discharging outlet 4*a*, and the discharging outlet 4*a* is substantially covered with the developer. Thus, the internal pressure of the developer supplying container 1 decreases as the volume of the interior of the developer supplying container 1 increases.

In this state, since the internal pressure of the developer supplying container 1 is lower than the atmospheric pressure (or the outside-air pressure), the air outside the developer supplying container 1 is moved into the developer supplying container 1 through the discharging outlet 4*a*, by the difference in pressure between the inside and the outside of the developer supplying container 1. Since the air is taken in from the outside of the developer supplying container 1 through the discharging outlet 4*a*, the developer located in the vicinity of the discharging outlet 4*a* can be made less dense (or can be fluidized). Specifically, the developer can be appropriately fluidized by decreasing the bulk density of the developer located in the vicinity of the discharging outlet 4*a*, by causing the developer to contain the air. Furthermore, since the air is taken in the developer supplying container 1 through the discharging outlet 4*a*, the internal pressure of the developer supplying container 1 is kept at or near the atmospheric pressure (or the outside-air pressure) though the volume of the developer supplying container 1 increases.

Since the developer is fluidized in this manner, the developer can be discharged smoothly from the discharging outlet 4*a*, without the discharging outlet 4*a* being clogged with the developer. Thus, the amount of developer discharged from the discharging outlet 4*a* per unit time can be kept almost constant for a long period of time.

Note that even if the state of the pump portion 3*a* is not changed from a state where the pump portion 3*a* is contracted to a maximum extent, to a state where the pump portion 3*a* is expanded to a maximum extent, the intake operation is performed. For example, even if the pump portion 3*a* stops when the state of the pump portion 3*a* changes from a state where the pump portion 3*a* is contracted to a maximum extent, to a state where the pump portion 3*a* is expanded to a maximum extent, the intake operation is performed if the internal pressure of the developer supplying container 1 is changed. The intake process is performed in a state where the reciprocating-member projection 3*c* is engaged with the cam groove 2*f* illustrated in FIG. 8.

Discharge Process

Next, the discharge process will be described. If the state of the pump portion 3*a* is changed from a state in which the pump portion 3*a* is expanded to a maximum extent (FIG. 7B), to a state in which the pump portion 3*a* is contracted to a maximum extent (FIG. 7C), the discharge operation is performed via the discharging outlet 4*a*. In the discharge operation, the volume of the interior (i.e., the cylindrical portion 2*k*, the discharging portion 4*c*, and the pump portion 3*a*) of the developer supplying container 1 is decreased. In this operation, the interior of the developer supplying container 1 is hermetically sealed substantially, except for the discharging outlet 4*a*, and the discharging outlet 4*a* is substantially covered with the developer until the developer is discharged. The internal pressure of the developer supplying container 1 increases as the volume of the interior of the developer supplying container 1 decreases.

In this state, since the internal pressure of the developer supplying container 1 is higher than the atmospheric pressure (or the outside-air pressure), the developer is pushed out from the discharging outlet 4*a*, by the difference in pressure between the inside and the outside of the developer supplying container 1. That is, the developer is discharged from the developer supplying container 1 to the developer supplying apparatus 201. In addition, since the air inside the developer supplying container 1 is also discharged together with the developer, the internal pressure of the developer supplying container 1 decreases. Thus, in the present embodiment, since the developer can be discharged efficiently by using the single pump portion 3*a* that reciprocates, the mechanism for discharging the developer can be simplified.

Note that even if the state of the pump portion 3*a* is not changed from a state where the pump portion 3*a* is expanded to a maximum extent, to a state where the pump portion 3*a* is contracted to a maximum extent, the discharge operation is performed. For example, even if the pump portion 3*a* stops when the state of the pump portion 3*a* changes from a state where the pump portion 3*a* is expanded to a maximum extent, to a state where the pump portion 3*a* is contracted to a maximum extent, the discharge operation is performed if the internal pressure of the developer supplying container 1 is changed. The discharge process is performed in a state where the reciprocating-member projection 3*c* is engaged with the cam groove 2*g* illustrated in FIG. 8.

Operation Stop Process

Next, the operation stop process will be described. As described above, in a configuration in which the hopper 10*a* is not disposed, and the controller 600 controls the operation of the driving motor 500, depending on the detection result by the magnetic sensor 800*c*, the amount of developer supplied from the developer supplying container 1 directly affects the toner density. Thus, for stabilizing the amount of developer supplied from the developer supplying container 1, it is desirable that the amount of change of the volume of the interior of the developer supplying container 1 be constant every time the volume of the interior of the developer supplying container 1 is changed.

For example, if the cam groove 2*e* is made for only the discharge process and the intake process, the driving of the motor will be stopped during the discharge process or the intake process. In this case, even after the rotation of the driving motor 500 is stopped, the cylindrical portion 2*k* is rotated by inertia. Thus, the pump portion 3*a* also continues to reciprocate in accordance with the movement of the cylindrical portion 2*k*, and the discharge process or the intake process is performed until the cylindrical portion 2*k* stops. The distance by which the cylindrical portion 2*k* is rotated by inertia depends on the rotational speed of the cylindrical portion 2*k*. In addition, the rotational speed of the cylindrical portion 2*k* depends on the torque applied to the driving motor 500. Since the torque applied to the driving motor 500 changes depending on the weight (or the amount) of the developer stored in the developer supplying container 1, and the speed of the cylindrical portion 2*k* may change, it is difficult to make the stop position of the pump portion 3*a* constant every time the pump portion 3*a* is stopped.

For this reason, for making the pump portion 3*a* stop at a predetermined position every time the pump portion 3*a* is stopped, it is necessary to form an area in the cam groove 2*e*, in which the pump portion 3*a* does not reciprocate even when the cylindrical portion 2*k* rotates. In the present embodiment, the cam groove 2*h* illustrated in FIG. 8 is formed for preventing the pump portion 3*a* from reciprocating. The cam groove 2*h* is a groove area formed in the rotational direction of the cylindrical portion 2*k*, and has a straight shape that prevents the reciprocating member 3*b* from moving even if the cylindrical portion 2*k* rotates. The operation stop process is performed in a state where the reciprocating-member projection 3*c* is engaged with the cam groove 2*h*.

If the pump portion 3*a* does not reciprocate, the developer is not discharged from the discharging outlet 4*a* (although the developer is allowed to fall from the discharging outlet 4*a* due to the vibration caused when the cylindrical portion 2*k* rotates). That is, the cam groove 2*h* may be sloped toward the rotation-axis direction with respect to the rotational direction if the discharge process and the intake process are not performed via the discharging outlet 4*a* when the reciprocating-member projection 3*c* and the cam groove 2*h* are engaged with each other. In a case where the cam groove 2*h* is sloped, the reciprocating motion of the pump portion 3*a* that corresponds to the slope of the cam groove 2*h* is allowed.

Configuration of Flange Portion

Figure 9A:
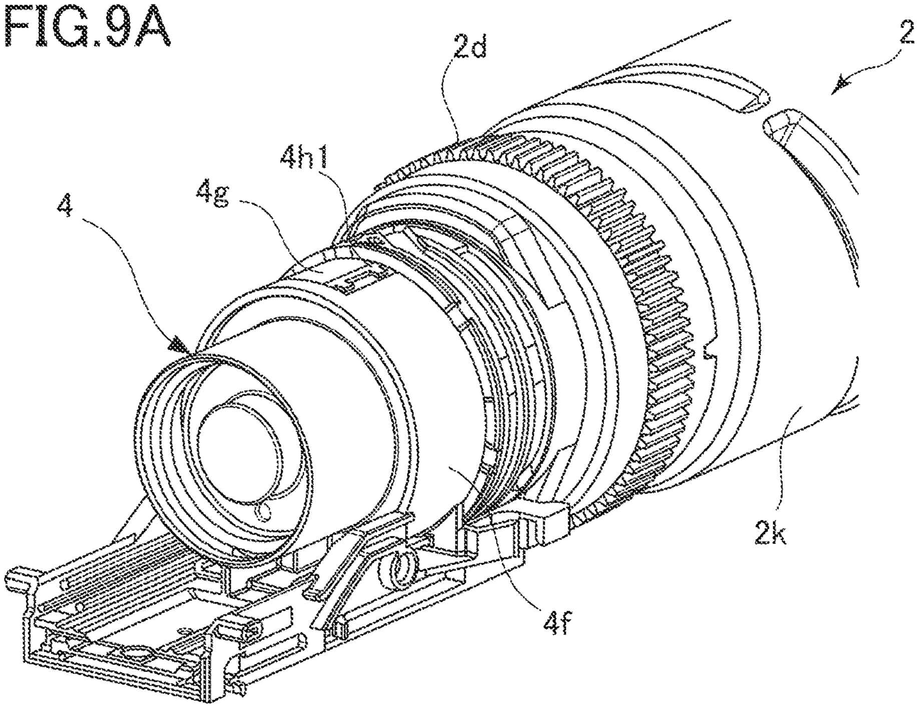
FIG. 9A is a perspective view illustrating a flange portion and the developer storage portion engaged with each other.

Next, a configuration of the flange portion 4 of the developer supplying container 1 of the present embodiment will be described with reference to FIGS. 9A to 10B. As illustrated in FIG. 9A, the developer storage portion 2 is rotatably attached to the flange portion 4 such that the one end portion having the opening portion 2H of the developer storage portion 2 that is opened enters the flange portion 4.

The flange portion 4 of the present embodiment includes a first flange 4*f* that serves as a first separation portion, and a second flange 4*g* that serves as a second separation portion.

Figure 9B:
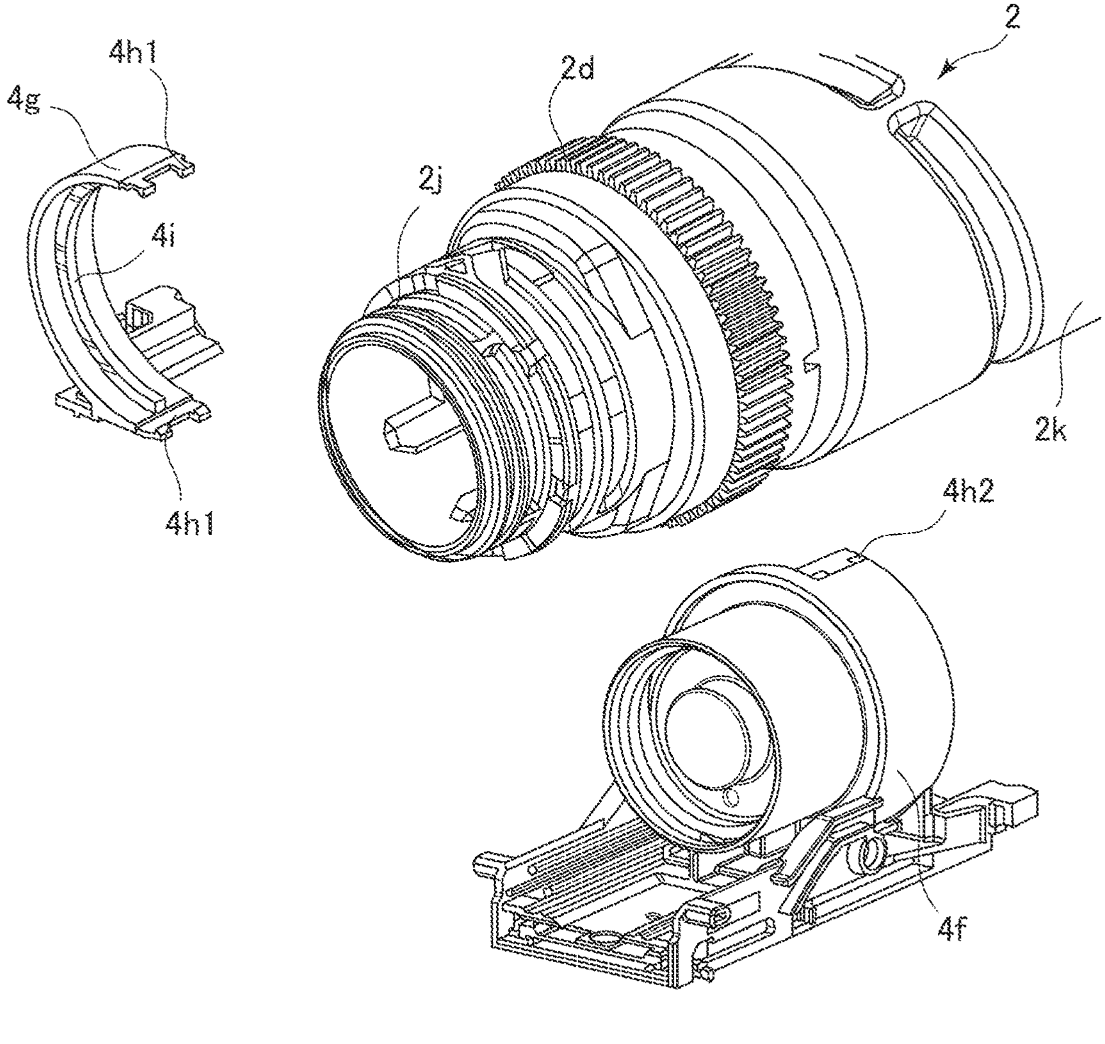
FIG. 9B is a perspective view illustrating the flange portion and the developer storage portion separated from each other.

As illustrated in FIG. 9B, the second flange 4*g* can be detachably attached to the first flange 4*f* in a direction that crosses the rotation-axis direction of the developer storage portion 2. In addition, the first flange 4*f* and the second flange 4*g* are engaged with each other via a flexible engaging hook 4*h*1. In the present embodiment, the engaging hook 4*h*1 is formed on the second flange 4*g*, as a connect engaging portion via which the second flange 4*g* is detachably engaged with the first flange 4*f*, and an engaging hole portion 4*h*2 that engages with the engaging hook 4*h*1 is formed in the first flange 4*f*. However, the present disclosure is not limited to this. For example, the engaging hook may be formed on the first flange 4*f*, and the engaging hole portion may be formed in the second flange 4*g*.

Figure 10A:
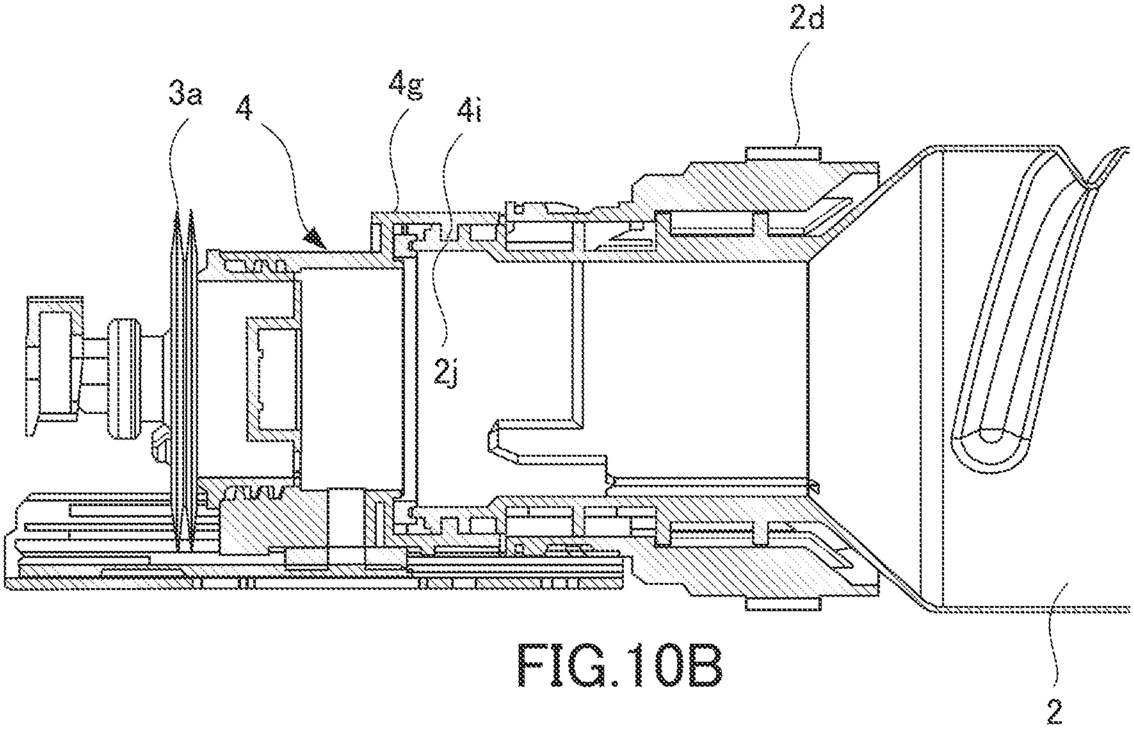
FIG. 10A is cross-sectional view illustrating the flange portion and the developer storage portion engaged with each other.
Figure 10B:
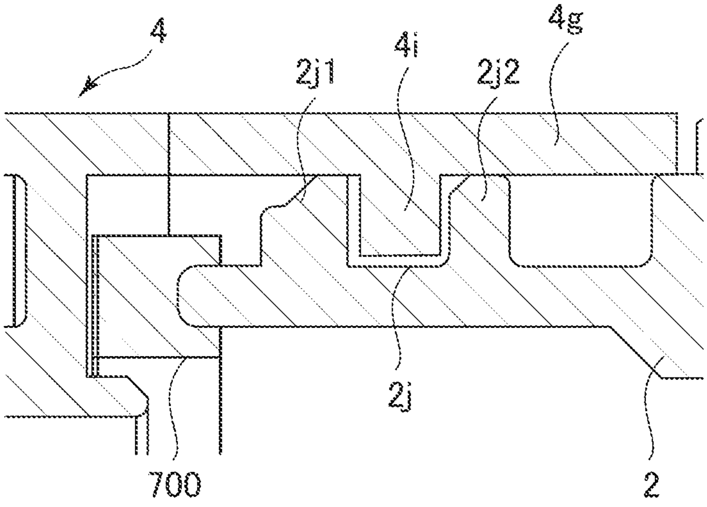
FIG. 10B is an enlarged cross-sectional view of a projection portion and a groove portion.

The developer storage portion 2 is rotatably connected to the flange portion 4 in a state where the first flange 4*f* and the second flange 4*g* are engaged with each other via the engaging hook 4*h*1. As illustrated in FIGS. 9B, 10A, and 10B, in the present embodiment, a groove portion 2*j* having a recess shape, serving as a first engaging portion, and extending in the rotational direction (or the circumferential direction) is formed in an outer circumferential surface of the one end portion of the developer storage portion 2 in the rotation-axis direction. The outer circumferential surface of the one end portion of the developer storage portion 2 faces the second flange 4*g*. That is, the groove portion 2*j* is formed in a recessed shape.

On the other hand, a projection portion 4*i* having a projection shape, serving as a second engaging portion, and extending in the rotational direction is formed on the inner circumferential surface of the second flange 4*g*. That is, the projection portion 4*i* is formed in a projected shape. In the present embodiment, the projection portion 4*i* is formed on only the second flange 4*g*. Since the projection portion 4*i* engages with the groove portion 2*j*, the developer storage portion 2 can be rotatably connected to the flange portion 4 in a state where the developer storage portion 2 is prevented from being disconnected from the flange portion 4. If the engagement between the first flange 4*f* and the second flange 4*g* via the engaging hook 4*h*1 is removed, the second flange 4*g* is separated from the first flange 4*f*. Thus, in the present embodiment, the flange portion 4 can be separated into the first flange 4*f* and the second flange 4*g*. In a state where the flange portion 4 is separated into the first flange 4*f* and the second flange 4*g*, the developer storage portion 2 can be detachably attached to the flange portion 4.

Note that as illustrated in FIG. 10B, the developer storage portion 2 is rotatably connected to the flange portion 4 such that the developer storage portion 2 depresses a ring-shaped flange seal 700 having elasticity and disposed on the inner surface of the flange portion 4. In this structure, since the developer storage portion 2 rotates while sliding on the flange seal 700, the developer stored in the developer storage portion 2 does not leak from the boundary between the first flange 4*f* and the second flange 4*g*.

In the present embodiment, the flange portion 4 is separated into two halves, the first flange 4*f* and the second flange 4*g*, whose length is nearly half the length of the flange portion 4 in the rotational direction. In other words, the first flange 4*f* and the second flange 4*g* have the same length in the circumferential direction, and the length is half the length of the flange portion 4 in the circumferential direction. In this case, the developer storage portion 2 can be attached to the first flange 4*f* from a direction (hereinafter referred to as a radial direction) that crosses the rotation-axis direction of the developer storage portion 2 attached to the first flange 4*f*. Thus, the projection portion 4*i* may not be formed on the second flange 4*g* alone, and may be formed on at least one of the first flange 4*f* and the second flange 4*g*. For example, if the projection portion 4*i* is formed on the first flange 4*f*, the developer storage portion 2 is attached to the first flange 4*f* from the radial direction. When the developer storage portion 2 is attached to the first flange 4*f*, the projection portion 4*i* formed on the first flange 4*f* engages with the groove portion 2*j* of the developer storage portion 2, and then the second flange 4*g* is engaged with the first flange 4*f* via the engaging hook 4*h*1.

Note that the projection portion 4*i* has only to be formed on only one of the first flange 4*f* and the second flange 4*g*. However, the projection portion 4*i* may be formed on both of the first flange 4*f* and the second flange 4*g*. Preferably, the groove portion 2*j* is formed in the whole circumference of the outer circumferential surface of the developer storage portion 2. In this case, it is advantageous that the developer storage portion 2 rotates stably with respect to the flange portion 4.

As illustrated in FIG. 10B, in the present embodiment, the groove portion 2*j* is formed by a first projection portion 2*j*1 and a second projection portion 2*j*2, which are spaced from each other in the rotation-axis direction so as to project from the outer circumferential surface of the developer storage portion 2 toward a direction that crosses the rotation-axis direction. In this case, the leading edges of the first projection portion 2*j*1 and the second projection portion 2*j*2 slide on the inner circumferential surfaces of the first flange 4*f* and the second flange 4*g* when the developer storage portion 2 rotates. However, the groove portion 2*j* may be formed in the outer circumferential surface of the developer storage portion 2 so as to have a recess shape, without forming the first projection portion 2*j*1 and the second projection portion 2*j*2. In this case, the outer circumferential surface of the developer storage portion 2 slide on the inner circumferential surfaces of the first flange 4*f* and the second flange 4*g* when the developer storage portion 2 rotates.

In the present embodiment, the projection portion 4*i* is formed on the first flange 4*f* and/or the second flange 4*g*, and the groove portion 2*j* is formed in the developer storage portion 2. However, the projection portion 4*i* may be formed on the developer storage portion 2, and the groove portion 2*j* may be formed in the first flange 4*f* and/or the second flange 4*g*.

As described above, in the present embodiment, the flange portion 4 includes the first flange 4*f* and the second flange 4*g*, and the first flange 4*f* and the second flange 4*g* are engaged with each other via the engaging hook 4*h*1. For the connection between the developer storage portion 2 and the flange portion 4 in a state where the first flange 4*f* and the second flange 4*g* are engaged with each other, the groove portion 2*j* is formed in the developer storage portion 2 and the projection portion 4*i* is formed on the second flange 4*g*. Since the projection portion 4*i* is engaged with the groove portion 2*j*, the developer storage portion 2 is prevented from being disconnected from the flange portion 4. If the engagement between the first flange 4*f* and the second flange 4*g* via the engaging hook 4*h*1 is removed, the second flange 4*g* is separated from the first flange 4*f* in a direction that crosses the rotation-axis direction of the developer storage portion 2. Thus, if the engagement between the first flange 4*f* and the second flange 4*g* via the engaging hook 4*h*1 is removed, the flange portion 4 is separated into the first flange 4*f* and the second flange 4*g*. In addition, in a state where the flange portion 4 is separated into the first flange 4*f* and the second flange 4*g*, the developer storage portion 2 can be detachably attached to the flange portion 4. In this case, the flange portion 4 and the developer storage portion 2 can be separated from each other, without the engaging hook 4*h*1 being broken. Therefore, since the flange portion 4 and the developer storage portion 2 are not damaged and deformed when the flange portion 4 and the developer storage portion 2 are separated from each other in a used developer supplying container 1, the reuse rate of the flange portion 4 and the developer storage portion 2 is increased.

Other Embodiments

Figure 11A:
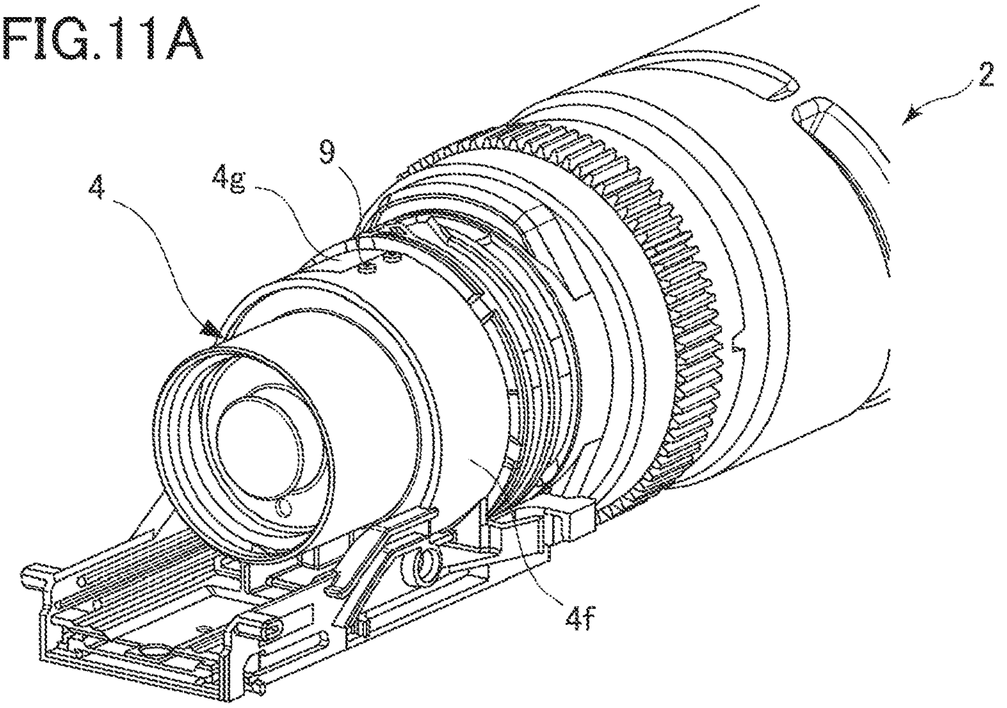
FIG. 11A is a perspective view illustrating one example of a first flange and a second flange fastened to each other via a screw.
Figure 11B:
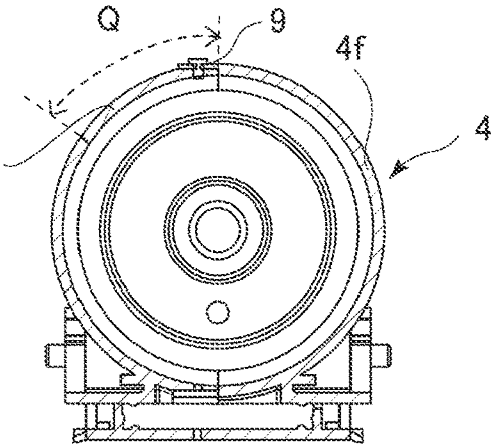
FIG. 11B is a front view in which the flange portion is viewed from a rotation-axis direction.
Figure 11C:
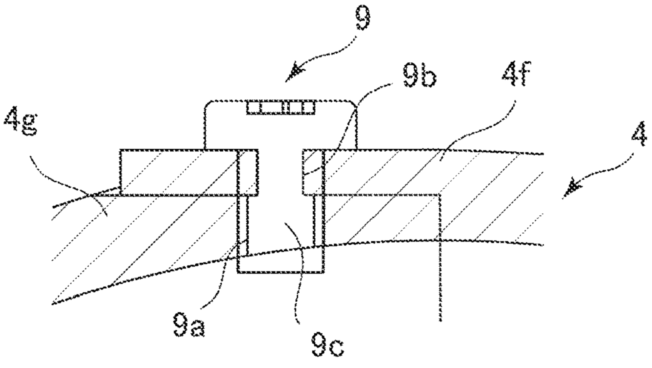
FIG. 11C is an enlarged cross-sectional view illustrating portions fastened to each other via a screw.

In the above-described embodiment, the first flange 4*f* and the second flange 4*g* are engaged with each other via the engaging hook 4*h*1. However, the first flange 4*f* and the second flange 4*g* may be engaged with each other via another member other than the above-described engaging hook 4*h*1 as long as the second flange 4*g* can be attached to and detached from the first flange 4*f*. For example, the first flange 4*f* and the second flange 4*g* may be fastened to each other via a screw. FIGS. 11A to 11C illustrate one example of a configuration in which the first flange 4*f* and the second flange 4*g* are fastened to each other via a screw 9. In this example, one end portion of the second flange 4*g* in the rotational direction is fastened to the first flange 4*f* via the screw 9, and the other end portion of the second flange 4*g* is fastened to the first flange 4*f* via the above-described engaging hook 4*h*1 (not illustrated). However, the present disclosure is not limited to this. For example, both end portions of the second flange 4*g* may be fastened to the first flange 4*f* via screws 9.

As illustrated in FIGS. 11A to 11C, the second flange 4*g* can be detachably attached to the first flange 4*f* in a direction that crosses the rotation-axis direction of the developer storage portion 2, and the first flange 4*f* and the second flange 4*g* are fastened to each other via the screw 9. In the present embodiment, a screw hole portion 9*a* is formed in the second flange 4*g*, and a through-hole portion 9*b* is formed in the first flange 4*f*. The through-hole portion 9*b* has a diameter that allows a shaft portion 9*c* of the screw 9 to pass through the first flange 4*f*, and does not allow the head portion of the screw 9 to pass through the first flange 4*f*. The first flange 4*f* and the second flange 4*g* are fastened to each other via the screw 9 in a state where the through-hole portion 9*b* of the first flange 4*f* and the screw hole portion 9*a* of the second flange 4*g* are aligned with each other, and in this manner, the developer storage portion 2 is rotatably connected to the flange portion 4. In addition, if the screw 9, via which the first flange 4*f* and the second flange 4*g* are fastened to each other, is removed from the flange portion 4, the second flange 4*g* is separated from the first flange 4*f*, so that the developer storage portion 2 can be removed from the flange portion 4.

By the way, the developer supplying container 1 may receive a strong impact during the transportation from a factory. In such a case, it is not preferable that the developer storage portion 2 is disconnected from the flange portion 4. For preventing the disconnection of the developer storage portion 2 from the flange portion 4, the above-described engaging hook 4*h*1 (see FIG. 9B) of the second flange 4*g* is required to have the strength that allows the engaging hook 4*h*1 to endure the impact, and that prevents the engaging hook 4*h*1 from being broken. However, if the strength of the engaging hook 4*h*1 is increased, the flexibility of the engaging hook 4*h*1 will be easily deteriorated. As a result, when the second flange 4*g* is separated from the first flange 4*f*, the engaging hook 4*h*1 may be broken and the second flange 4*g* may be damaged.

For this reason, in a configuration in which the first flange 4*f* and the second flange 4*g* are engaged with each other via the engaging hook 4*h*1, it is preferable that the size of the second flange 4*g* be smaller than that of the first flange 4*f*. For example, as illustrated in FIG. 11B, a length Q of the second flange 4*g* in the circumferential direction is made shorter than half the length of the flange portion 4 in the circumferential direction. In other words, the length Q of the second flange 4*g* in the circumferential direction is made shorter than the length of the first flange 4*f* in the circumferential direction. In this case, even if the engaging hook 4*h*1 is broken when the second flange 4*g* is separated from the first flange 4*f*, the first flange 4*f* can be reused. On the other hand, since the second flange 4*g* with the broken engaging hook 4*h*1 cannot be reused, the second flange 4*g* will be replaced with a new second flange 4*g*. Since most of the flange portion 4 (i.e., the first flange 4*f*) can be reused, the cost for the replacement can be preferably reduced.

Note that if the length Q of the second flange 4*g* in the circumferential direction is shorter, as described above, than the length of the first flange 4*f* in the circumferential direction, it is difficult to attach the developer storage portion 2 to the first flange 4*f* from the radial direction. In this case, the developer storage portion 2 is attached to the first flange 4*f* from the rotation-axis direction of the developer storage portion 2 attached to the first flange 4*f*. In this case, the projection portion 4*i* (see FIG. 9B) is formed on only the second flange 4*g*, and is not formed on the first flange 4*f*. This is because if the projection portion 4*i* is formed on the first flange 4*f*, the developer storage portion 2 will abut against the projection portion 4*i* of the first flange 4*f* when the developer storage portion 2 is inserted to the first flange 4*f*, and it will become difficult to insert the developer storage portion 2 to the first flange 4*f* until the developer storage portion 2 reaches a proper position.

The present invention can easily separate the developer storage portion and the developer discharging portion from each other without damaging and deforming the developer storage portion and the developer discharging portion, in the developer supplying container in which the developer storage portion and the developer discharging portion can be separated from each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-008243, filed Jan. 23, 2023 which is hereby incorporated by reference herein in its entirety.

What is claimed is:

1. A developer supplying container comprising:

a rotary cylindrical accommodating portion including an opening portion formed at one end portion of the accommodating portion in a rotation-axis direction, the accommodating portion being configured to receive rotational driving force and rotate such that developer accommodated in the accommodating portion is conveyed toward the one end portion; and a developer discharging portion including a connection portion and a discharging outlet, the connection portion being a portion that is disposed to cover around the one end portion of the accommodating portion and to which the accommodating portion is connected relatively rotatably with respect to the developer discharging portion, the discharging outlet being configured to discharge developer supplied from the opening portion of the accommodating portion, wherein the connection portion includes a first separation portion and a second separation portion configured to be separated from each other in a direction intersecting with the rotation-axis direction of the accommodating portion, and a connect engaging portion configured to detachably attach the second separation portion to the first separation portion, wherein the accommodating portion includes a first engaging portion formed in an outer circumferential surface of the one end portion covered by the connection portion, and wherein at least one of the first separation portion and the second separation portion includes a second engaging portion configured to engage with the first engaging portion in a state where the one end portion of the accommodating portion is covered by the connection portion, and prevent the connection portion from being disconnected from the accommodating portion in the rotation-axis direction.

2. The developer supplying container according to claim 1, wherein a length of the second separation portion in a circumferential direction is equal to a length of the first separation portion in the circumferential direction.

3. The developer supplying container according to claim 1, wherein a length of the second separation portion in a circumferential direction is shorter than a length of the first separation portion in the circumferential direction, and wherein the second engaging portion is formed on the second separation portion and is not formed on the first separation portion.

4. The developer supplying container according to claim 1, wherein the first engaging portion is formed in a recessed shape, and wherein the second engaging portion is formed in a projected shape.

5. The developer supplying container according to claim 1, wherein the second engaging portion is formed on an inner circumferential surface of the second separation portion such that the second engaging portion extends in a circumferential direction.

6. The developer supplying container according to claim 1, wherein the connect engaging portion includes a flexible engaging hook formed on one of the first separation portion and the second separation portion, and an engaging hole portion formed in another of the first separation portion and the second separation portion and configured to engage with the engaging hook.

7. The developer supplying container according to claim 1, wherein the connect engaging portion includes a screw, a through-hole portion, and a screw hole portion, the through-hole portion being formed in one of the first separation portion and the second separation portion and having a diameter that allows a shaft portion of the screw to pass through the one of the first separation portion and the second separation portion, and that does not allow a head portion of the screw to pass through the one of the first separation portion and the second separation portion, the screw hole portion being a hole which is formed in another of the first separation portion and the second separation portion and to which the screw is fastened.

* * * * *